US008509978B2

(12) United States Patent
Kato et al.

(10) Patent No.: US 8,509,978 B2
(45) Date of Patent: Aug. 13, 2013

(54) ELECTRIC POWERED VEHICLE AND CONTROL METHOD FOR THE SAME

(75) Inventors: Norihiko Kato, Handa (JP); Masaya Yamamoto, Kasugai (JP); Haruki Sato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/260,487

(22) PCT Filed: Jun. 10, 2009

(86) PCT No.: PCT/JP2009/060591
§ 371 (c)(1),
(2), (4) Date: Sep. 26, 2011

(87) PCT Pub. No.: WO2010/143280
PCT Pub. Date: Dec. 16, 2010

(65) Prior Publication Data
US 2012/0022738 A1   Jan. 26, 2012

(51) Int. Cl.
*B60L 11/00* (2006.01)
(52) U.S. Cl.
USPC .............................................. 701/22; 307/9.1
(58) Field of Classification Search
USPC ................ 701/22; 180/65.1, 65.21; 307/9.1, 307/10.1, 10.7
See application file for complete search history.

(56) References Cited

U.S. PATENT DOCUMENTS

| 6,908,162 B2 | 6/2005 | Obayashi et al. |
| 8,004,109 B2 * | 8/2011 | Komatsu ................... 307/9.1 |

FOREIGN PATENT DOCUMENTS

| EP | 2 104 199 A1 | 9/2009 |
| JP | 2003-209969 A | 7/2003 |
| JP | 2004-312863 A | 11/2004 |
| JP | 2004-359032 A | 12/2004 |
| JP | 2006-174543 A | 6/2006 |
| JP | 2008-109840 A | 5/2008 |
| JP | 2008-167620 A1 | 7/2008 |
| JP | 2008-220084 A | 9/2008 |

OTHER PUBLICATIONS

Japanese Patent Office, International Search Report in International Patent Application No. PCT/JP2009/060591, dated Sep. 15, 2009.

* cited by examiner

*Primary Examiner* — Yonel Beaulieu
(74) *Attorney, Agent, or Firm* — Kenyon & Kenyon LLP

(57) ABSTRACT

An electric powered vehicle includes a motor, an inverter, a main power storage device, and a plurality of sub power storage devices. A converter is connected to a selected one of the plurality of sub power storage devices to perform voltage conversion bidirectionally between the selected sub power storage device and an electric power feeding line. A control device executes a disconnection process to disconnect a selected sub power storage device from the converter based on a state of charge of the selected sub power storage device when there is no new sub power storage device that can replace the selected sub power storage device. Further, the control device executes a braking process for the inverter for regenerative braking by the motor. The control device prohibits, during execution of one process of a disconnection process and braking process, the other process.

12 Claims, 17 Drawing Sheets

ELECTRIC POWERED VEHICLE AND CONTROL METHOD FOR THE SAME

CROSS REFERENCE TO RELATED APPLICATION

This is a 371 national phase application of PCT/JP2009/060591 filed Jun. 10, 2009, the content of which is incorporated herein by reference in its entirety.

TECHNICAL FIELD

The present invention relates to electric powered vehicles and methods of controlling the same, and more particularly to controlling an electric powered vehicle mounted with a power supply system including a main power storage device and a plurality of sub power storage devices.

BACKGROUND ART

In recent years as an environmentally friendly vehicle, electric powered vehicles such as an electric vehicle, hybrid vehicle and fuel cell vehicle have been developed into practical use. An electric powered vehicle has mounted thereon an electric motor generating force to drive the vehicle, and a power supply system including a power storage device for supplying electric power to drive the motor.

Particularly, there has been proposed a configuration for charging a vehicle-mounted power storage device in a hybrid vehicle by means of a power supply external to the vehicle (hereinafter also referred to as an "external power supply"), and accordingly, there is a demand for increasing the travel distance allowed through the electric power stored in the vehicle-mounted power storage device. Hereinafter, charging a vehicle-mounted power storage device by an external power supply will also simply be referred to as "external charging".

For example, Japanese Patent Laying-Open No. 2008-109840 (Patent Document 1) and Japanese Patent Laying-Open No. 2003-209969 (Patent Document 2) describe a power supply system having a plurality of power storage devices (batteries) connected in parallel. The power supply system described in Patent Document 1 and Patent Document 2 is provided with a voltage converter (a converter) for each power storage device (battery) as a charging/discharging adjustment mechanism. In contrast, Japanese Patent Laying-Open No. 2008-167620 (Patent Document 3) describes a power supply device in a vehicle having a main power storage device and a plurality of sub power storage devices mounted thereon, including a converter corresponding to the main power storage device and a converter shared by the plurality of sub power storage devices. This configuration is advantageous in that the storable amount of energy is increased while the number of elements constituting the device can be suppressed.

In particular, the configuration described in Patent Document 3 has one of the plurality of sub power storage devices selectively connected to the converter to allow the main power storage device and the selected sub power storage device to supply driving power for an electric motor to drive the vehicle. When the sub power storage device in use has a decreased state of charge (SOC) in the power supply device, a different sub power storage device is newly connected to the converter such that the plurality of sub power storage devices are sequentially used to increase the travel distance allowed through the stored electric energy (EV (electric vehicle) travel distance).

CITATION LIST

Patent Literature

PTL 1: Japanese Patent Laying-Open No. 2008-109840
PTL 2: Japanese Patent Laying-Open No. 2003-209969
PTL 3: Japanese Patent Laying-Open No. 2008-167620

SUMMARY OF INVENTION

Technical Problem

By intentionally disconnecting all the sub power storage devices electrically from the converter when all the sub power storage devices have been depleted in the power supply system described in Patent Document 3, it can be expected that the power supply system can be subsequently controlled with an increased degree of freedom.

Generally in a braking mode of the electric powered vehicle, the kinetic energy is converted into electrical energy by the regenerative braking through the motor, and the electric energy is stored in the power storage device. In the case where the number of usable power storage devices is decreased during execution of regenerative braking, the electric energy that can be collected by the electric powered vehicle will become lower. In the case where the braking force through regenerative braking is reduced thereby, there is a possibility of change in the driver's impression on the vehicle's response such as on the manipulation of the brake pedal.

In view of the foregoing, an object of the present invention is to prevent, in an electric powered vehicle mounted with a power supply system including a main power storage device and a plurality of sub power storage devices, a disconnecting process of a sub power storage device from adversely affecting the braking of the electric powered vehicle.

Solution to Problem

The present invention according to an aspect is directed to an electric powered vehicle. The electric powered vehicle includes a motor, an inverter, a main power storage device, an electric power feeding line, a first voltage converter, a plurality of sub power storage devices, a second voltage converter, a connection unit, a connection control unit, a traveling control unit, and a selection control unit. The motor is capable of generating vehicle driving power, and performing regenerative braking. The inverter controls the motor. The electric power feeding line feeds power to the inverter for generating vehicle driving power by the motor, and transmits the power output from the inverter by regenerative braking of the motor. The first voltage converter is provided between the electric power feeding line and the main power storage device, and is configured to perform voltage conversion bidirectionally. The plurality of sub power storage devices are provided parallel with each other. The second voltage converter is provided between the plurality of sub power storage devices and the electric power feeding line, and is configured to perform voltage conversion bidirectionally between a selected one of the plurality of sub power storage devices and the electric power feeding line. The connection unit is provided between the plurality of sub power storage devices and the second voltage converter, and is configured to connect and disconnect the selected sub power storage device to and from the second voltage converter. The connection control unit is configured to execute a disconnection process for disconnecting the selected sub power storage device from the second voltage converter based on a state of charge of the selected sub power storage device when there is no new sub power storage device that can replace the selected sub power storage device. The traveling control unit is configured to execute a braking process controlling the inverter for regenerative braking by the motor. The selection control unit is configured to prohibit, during execution of one process of a disconnection process by the disconnection control unit and a braking process by the traveling control unit, execution of the other process.

Preferably, the disconnection process includes first to fourth processes. The first process includes a process of determining whether disconnection of the selected sub power storage device from the second voltage converter is required or not based on the state of charge of the selected sub power storage device. The second process includes a process of controlling the first voltage converter such that the voltage of the electric power feeding line attains a predetermined voltage higher than an output voltage from the main power storage device and an output voltage from the selected sub power storage device, when determination is made that disconnection of the selected sub power storage device is required. The third process includes a process of setting an upper limit on electric power input/output by the selected sub power storage device at zero after the voltage of the electric power feeding line reaches the predetermined voltage. The fourth process includes a process of controlling the connection unit such that the selected sub power storage device is disconnected from the second voltage converter in response to the upper limit on electric power input/output being set at zero. The connection control unit includes a disconnection determination unit configured to execute the first process, a step-up-voltage instruction unit configured to execute the second process, an electric power limiter unit configured to execute the third process, and a disconnection control unit configured to execute the fourth process.

Preferably, the electric power limiter unit is configured to gradually decrease the upper limit on electric power input/output down to zero when the third process is executed.

Preferably, the one process is the braking process, and the other process is the disconnection process.

Preferably, the one process is the disconnection process and the other process is the braking process.

Preferably, the electric powered vehicle further includes a hydraulic brake, and a brake control unit. The hydraulic brake is capable of generating a braking force of the electric powered vehicle independent of the regenerative braking by the motor. The brake control unit is configured to execute braking only by the hydraulic brake when a braking request for the electric powered vehicle is generated during execution of a disconnection process.

The present invention according to another aspect is directed to a control method for an electric powered vehicle. The electric motor includes a motor, an inverter, a main power storage device, an electric power feeding line, a first voltage converter, a plurality of sub power storage devices, a second voltage converter, a connection unit, and a control device. The motor is capable of generating vehicle driving power, and performing regenerative braking. The inverter controls the motor. The electric power feeding line feeds power to the inverter for generating vehicle driving power by the motor, and transmits the power output from the inverter by regenerative braking of the motor. The first voltage converter is provided between the electric power feeding line and the main power storage device, and is configured to perform voltage conversion bidirectionally. The plurality of sub power storage devices are provided parallel with each other. The second voltage converter is provided between the plurality of sub power storage devices and the electric power feeding line, and is configured to perform voltage conversion bidirectionally between a selected one of the plurality of sub power storage devices and the electric power feeding line. The connection unit is provided between the plurality of sub power storage devices and the second voltage converter, and is configured to connect and disconnect the selected sub power storage device with respect to the second voltage converter. The control device is configured to control the inverter and the connection unit. The control method includes the steps of: executing a disconnection process for disconnecting a selected sub power storage device from the second voltage converter based on a state of charge of the selected sub power storage device when there is no new sub power storage device that can replace the selected sub power storage device; executing a braking process controlling the inverter for regenerative braking by the motor; and prohibiting, during execution of one process of a disconnection process and a braking process, execution of the other process.

Preferably, the disconnection process includes first to fourth processes. The first process includes a process of determining whether disconnection of the selected sub power storage device from the second voltage converter is required or not based on the state of charge of the selected sub power storage device. The second process includes a process of controlling the first voltage converter such that the voltage of the electric power feeding line attains a predetermined voltage higher than an output voltage from the main power storage device and an output voltage from the selected sub power storage device, when determination is made that disconnection of the selected sub power storage device is required. The third process includes a process of setting an upper limit on electric power input/output by the selected sub power storage device at zero after the voltage of the electric power feeding line reaches the predetermined voltage. The fourth process includes a process of controlling the connection unit such that the selected sub power storage device is disconnected from the second voltage converter in response to the upper limit on electric power input/output being set at zero. The step of executing a disconnection process includes the steps of executing the first process, executing the second process, executing the third process, and executing the fourth process.

Preferably, the step of executing the third process includes the step of gradually decreasing the upper limit on electric power input/output down to zero.

Preferably, the one process is the braking process, and the other process is the disconnection process.

Preferably, the one process is the disconnection process and the other process is the braking process.

Preferably, the electric powered vehicle further includes a hydraulic brake capable of generating a braking force of the electric powered vehicle independent of the regenerative braking by the motor. The control device is configured to control the braking by the hydraulic brake. The control method further includes the step of executing braking only by the hydraulic brake when a braking request of the electric powered vehicle is generated during execution of a disconnection process.

Advantageous Effects of Invention

According to the present invention, an adverse effect of a sub power storage device disconnection process on the braking of an electric powered vehicle mounted with a power

DESCRIPTION OF EMBODIMENTS

Figure 1:
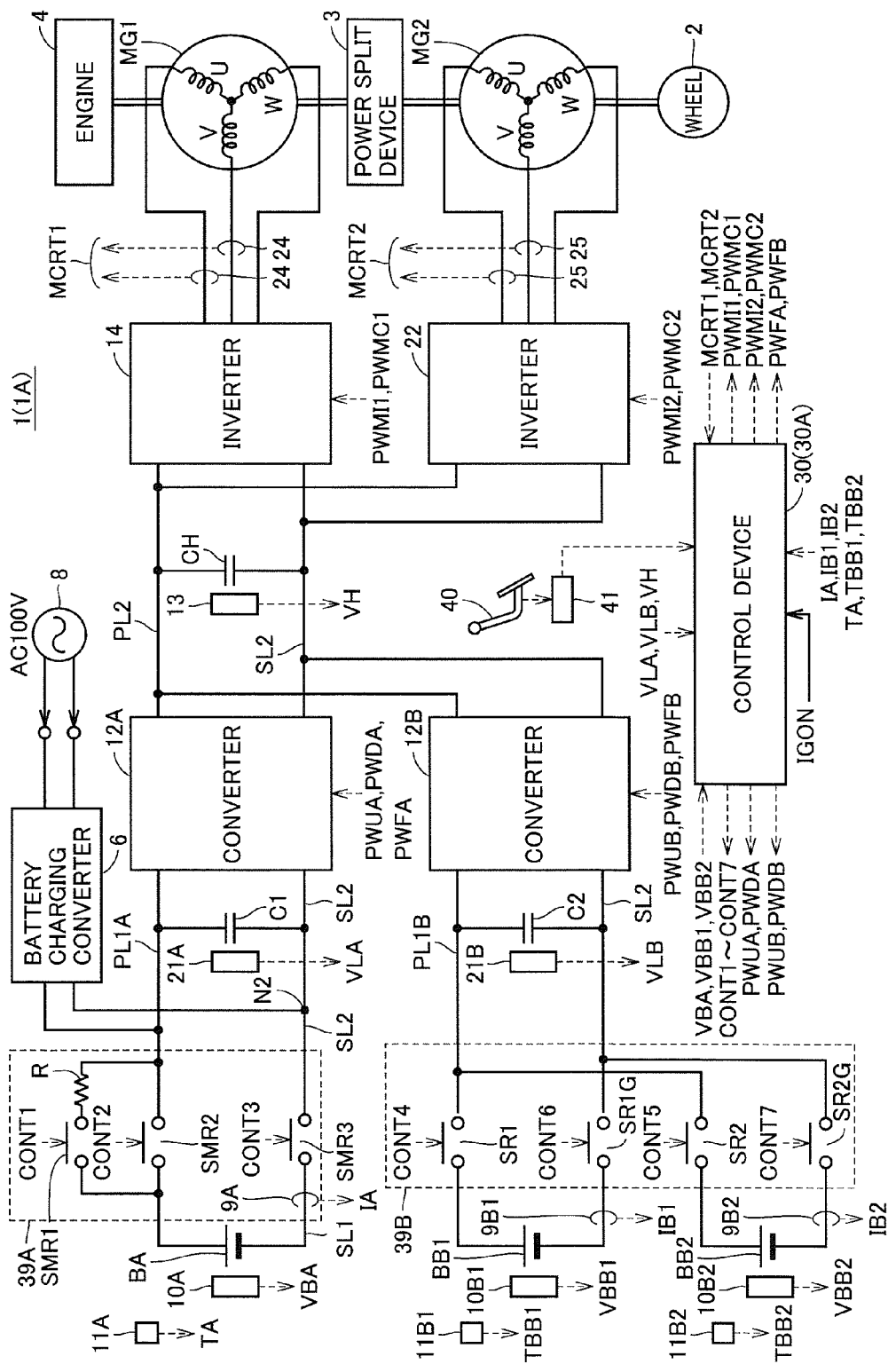
FIG. 1 shows a main configuration of an electric powered vehicle according to a first embodiment of the present invention.

Hereinafter reference will be made to the drawings to describe in detail the present invention in embodiments. In the following description, identical or equivalent components are denoted by identical reference characters and description thereof will not be repeated.

First Embodiment

FIG. 1 shows a main configuration of an electric powered vehicle according to a first embodiment of the present invention.

With reference to FIG. 1, an electric powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor generators MG1, MG2, a wheel 2, a power split device 3, an engine 4, and a control device 30.

The power supply system for an electric powered vehicle of the present embodiment includes a main power storage device implemented as battery BA, an electric power feeding line PL2 supplying electric power to inverter 14 driving motor generator MG2, a converter 12A provided between the main power storage device (BA) and electric power feeding line PL2 to serve as a voltage converter converting voltage bidirectionally, batteries BB1, BB2 implementing a plurality of sub power storage devices provided in a manner parallel with each other, and a converter 12B provided between the plurality of sub power storage devices (BB1, BB2) and electric power feeding line PL2 to serve as a voltage converter converting voltage bidirectionally. The voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that, when they are concurrently used, for example, the tolerable maximum power for an electric load (22, MG2) connected to the electric power feeding line can be output. This allows the vehicle to travel with maximum power in an EV (Electric Vehicle) running mode that does not use the engine. If the relevant sub power storage device's state of charge is decreased, the sub power storage device can be exchanged to cause the vehicle to travel further, and if the sub power storage device's electric power has completely been consumed, then, in addition to the main power storage device, the engine can be used to allow the vehicle to travel with maximum power without using the sub power storage device.

Furthermore, such a configuration allows converter 12B to be shared among the plurality of sub power storage devices. This can eliminate the necessity of increasing the number of converters corresponding to the number of the power storage devices. In order to further increase the EV travel distance, an additional battery can be introduced in parallel with batteries BB1, BB2.

Preferably, the main power storage device and sub power storage devices in the present electric powered vehicle are externally chargeable. For this purpose, electric powered vehicle 1 further includes a battery charging device (a charging converter) 6 for connection to an external power supply 8 which is, for example, a commercial power supply of AC 100V. Battery charging device 6 converts alternate current to direct current and also adjusts the voltage level to supply electric power charged to a battery. Note that external charging may be achieved by the above described configuration, and in addition, a system connecting a neutral point of a stator coil of motor generator MG1, MG2 to an alternate current power supply, or a system causing converters 12A, 12B to function together as an ac/dc conversion device.

Smoothing capacitor C1 is connected between a power supply line PL1A and a ground line SL2. Voltage sensor 21A senses voltage VLA across smoothing capacitor C1 for output to control device 30. Converter 12A can step up the voltage across smoothing capacitor C1 for output to electric power feeding line PL2.

Smoothing capacitor C2 is connected between a power supply line PL1B and ground line SL2. Voltage sensor 21B senses voltage VLB across smoothing capacitor C2 for output to control device 30. Converter 12B can step up the voltage across smoothing capacitor C2 for output to electric power feeding line PL2.

Smoothing capacitor CH smoothes the voltage stepped up by converters 12A, 12B. Voltage sensor 13 senses voltage VH across smoothing capacitor CH for output to control device 30.

Alternatively, in an opposite direction, converters 12A, 12B can step down voltage VH smoothed by smoothing capacitor CH for output to power supply lines PL1A, PL1B.

Inverter 14 receives direct current voltage from converter 12B and/or 12A, converts it to 3 phase alternate current voltage, and outputs it to motor generator MG1. Inverter 22 receives direct current voltage from converter 12B and/or 12A, converts it to 3 phase alternate current voltage, and outputs it to motor generator MG2.

Power split device 3 is a mechanism coupled to engine 4 and motor generators MG1, MG2 to distribute power therebetween. The power split device can for example be a planetary gear mechanism having the three shafts of rotation of a sun gear, a planetary carrier, and a ring gear. When two of the three shafts of rotation have their rotation determined in the planetary gear mechanism, the other one shaft of rotation is compulsively determined. These three shafts of rotation are connected to each shaft of rotation of engine 4, motor generator MG1, and motor generator MG2, respectively. Motor generator MG2 has its shaft of rotation coupled to vehicular wheel 2 by a reduction gear, a differential gear or the like (not shown). Furthermore, power split device 3 may further have a speed reducer incorporated therein with respect to the shaft of rotation of motor generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and node N2.

System main relays SMR1-SMR3 have their conduction/non-conduction states controlled (turned ON/OFF) by relay control signals CONT1-CONT3, respectively, issued from control device 30.

Voltage sensor 10A measures voltage VBA across battery BA. Furthermore, temperature sensor 11A measures temperature TA of battery BA, and current sensor 9A measures a current IA input/output to/from battery BA. These measurements by the sensors are output to control device 30. Based on these measurements, control device 30 monitors a state of battery BA represented by the state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction/non-conduction states controlled (turned ON/OFF) by relay control signals CONT4, CONT5, respectively, issued from control device 30. Relays SR1G, SR2G have their conduction/non-conduction states controlled (turned ON/OFF) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by the SOC.

Battery BA, BB1, BB2 may be, for example, a lead-acid battery, a nickel metal hydride battery, a lithium ion battery or a similar secondary battery, an electric double layer capacitor or a similar capacitor of large capacity, or the like.

The charging capacity of each power storage device can be determined according to the required conditions for electric powered vehicle 1 such as the running performance and the like. Therefore, the charging capacity may differ between the main power storage device and the sub power storage device. Moreover, the charging capacity may differ among the plurality of sub power storage devices. For the sake of convenience, the charging capacity (the maximum value of the amount of electricity that can be stored) of batteries BA, BB1 and BB2 is identical in the embodiments of the present invention.

Inverter 14 is connected to electric power feeding line PL2 and ground line SL2. Inverter 14 receives the voltage stepped up from converter 12A and/or converter 12B, and drives motor generator MG1, for example, to start engine 4. Furthermore, inverter 14 returns to converters 12A and 12B the electric power generated by motor generator MG1 by the power transmitted from engine 4. At this stage, converters 12A and 12B are controlled by control device 30 to operate as step down converters.

Current sensor 24 senses a current that flows to motor generator MG1 as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it to 3 phase alternate current voltage, and outputs it to motor generator MG2 that drives wheel 2. Furthermore, inverter 22 returns to converters 12A and 12B the electric power generated by motor generator MG2 as the vehicle is regeneratively braked. At this stage, converters 12A and 12B are controlled by control device 30 to operate as step down converters.

Current sensor 25 senses a current that flows to motor generator MG2 as a motor current value MCRT2, and outputs motor current value MCRT2 to control device 30.

Control device 30 is constituted by an electronic control unit (ECU) having a central processing unit (CPU) and a memory (not shown) incorporated therein, and in accordance with a map and a program stored in the memory, uses each sensor's measurement to perform an operation process. Note that control device 30 may have a portion configured to allow electronic circuitry or similar hardware to perform predetermined arithmetic and logical operations.

Specifically, control device 30 receives the torque command values and revolution speed for motor generators MG1, MG2, the values of voltage VBA, VBB1, VBB2, VLA, VLB, VH, motor current values MCRT1, MCRT2, and a start signal IGON. Control device 30 outputs a control signal PWUA instructing converter 12A to step up the voltage, a control signal PWDA to step down the voltage, a control signal PWFA to hold the upper arm and lower arm of converter 12A at an ON state and OFF state, respectively, and a shut-down signal for prohibiting an operation.

Similarly, control device 30 outputs a control signal PWUB instructing converter 12B to step up the voltage, a control signal PWDB to step down the voltage, a control signal PWFB to hold the upper arm and lower arm of converter 12B at an ON state and OFF state, respectively, and a shut-down signal for prohibiting an operation.

Furthermore, control device 30 outputs a control signal PWMI1 instructing inverter 14 to convert direct current voltage output from converters 12A, 12B to alternate current voltage for driving motor generator MG1, and a control signal PWMC1 to convert the alternate current voltage generated by motor generator MG1 to direct current voltage and return it toward converters 12A, 12B for regeneration.

Similarly, control device 30 outputs a control signal PWMI2 instructing inverter 22 to convert direct current voltage to alternate current voltage for driving motor generator MG2, and a control signal PWMC2 to convert the alternate current voltage generated by motor generator MG2 to direct current voltage and return it toward converters 12A, 12B for regeneration.

Electric powered vehicle 1 further includes a brake pedal 40, a brake pedal stroke sensor 41, and a hydraulic brake 42. Brake pedal 40 is operated by the user (driver). Brake pedal stroke sensor 41 detects the pedal stroke level when the user steps on brake pedal 40, and provides the detection result to control device 30. Control device 30 controls the regenerative braking by motor generator MG2 and the braking by hydraulic brake 42 based on the detected pedal stroke level. Accordingly, control device 30 issues a signal BRK to hydraulic brake 42.

Figure 2:
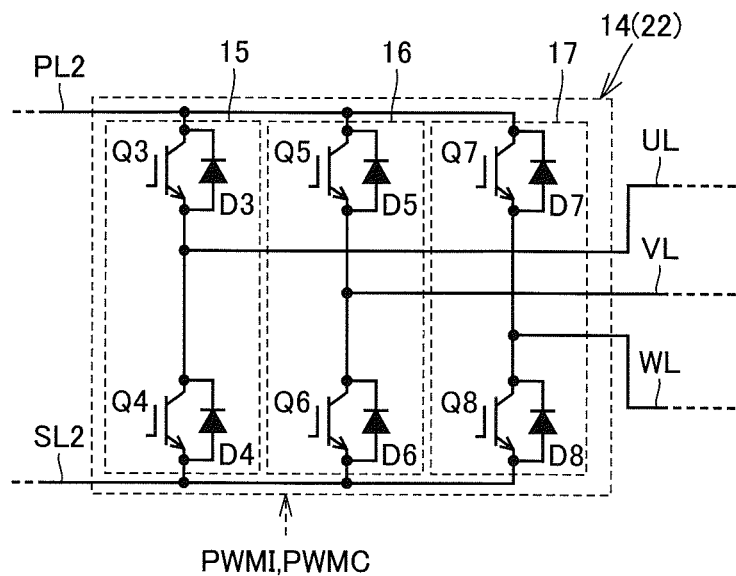
FIG. 2 is a circuit diagram showing in detail a configuration of each inverter shown in FIG. 1.

FIG. 2 is a circuit diagram showing in detail a configuration of each inverter shown in FIG. 1.

With reference to FIG. 2, inverter 14 includes a U phase aim 15, a V phase arm 16, and a W phase arm 17. U phase arm 15, V phase arm 16, and W phase arm 17 are connected between electric power feeding line PL2 and ground line SL2 in parallel.

U phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as done in U phase arm 15.

W phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as done in U phase arm 15.

Note that in the present embodiment an IGBT device is indicated as a representative example of a power semiconductor switching element controllable to be turned ON/OFF. In other words, it is also replaceable with a bipolar transistor, a field effect transistor or a similar power semiconductor switching element.

Each phase arm has an intermediate point connected to motor generator MG1 at each phase coil at each phase end. In other words, motor generator MG1 is a 3 phase permanent magnet synchronous motor and the three U, V, W phase coils each have one end connected together to an intermediate point. The U phase coil has the other end connected to a line UL drawn from a connection node of IGBT devices Q3, Q4. The V phase coil has the other end connected to a line VL drawn from a connection node of IGBT devices Q5, Q6. The W phase coil has the other end connected to a line WL drawn from a connection node of IGBT devices Q7, Q8.

Inverter 22 shown in FIG. 1 is different in that it is connected to motor generator MG2. However, its internal circuit configuration is similar to inverter 14. Accordingly it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
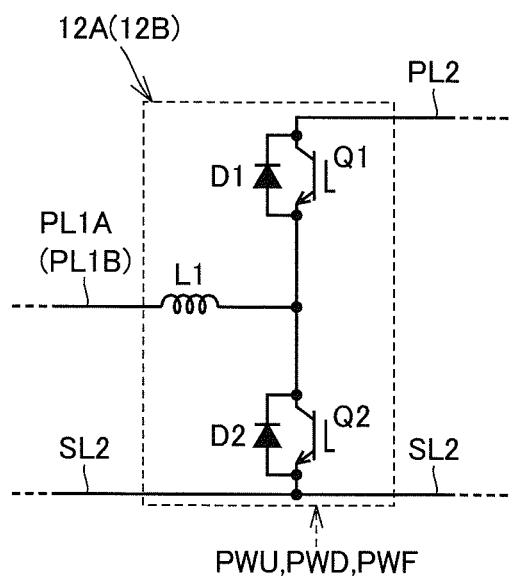
FIG. 3 is a circuit diagram showing in detail a configuration of each converter shown in FIG. 1.

FIG. 3 is a circuit diagram showing in detail a configuration of each converter shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter. Diode D2 has its cathode connected to IGBT device Q2 at the collector and its anode to IGBT device Q2 at the emitter. IGBT devices Q1, Q2 correspond to the upper arm and lower arm, respectively.

Converter 12B shown in FIG. 1 is different from converter 12A in that the former is not connected to power supply line PL1A and instead to power supply line PL1B. However, its internal circuit configuration is similar to converter 12A. Accordingly it will not be described repeatedly in detail. Furthermore, FIG. 3 shows a converter receiving control signals PWU, PWD, and PWF. This is to avoid complexity. Specifically, as shown in FIG. 1, different control signals PWUA, PWDA, PWFA and control signals PWUB, PWDB, PWF are input to converters 12A and 12B, respectively.

In the power supply system of electric powered vehicle 1, power is transmitted and received with respect to motor generators MG1 and MG2 by battery BA (main power storage device) and a selected one of batteries BB1 and BB2 (hereinafter, also referred to as "selected sub power storage device BB").

Control device 30 receives detected values from voltage sensor 10A, temperature sensor 11A and current sensor 9A to set an SOC (BA) indicating the main power storage device's residual capacity, an upper limit on electric power input Win (M) indicating an upper limit value of the charging electric power, and an upper limit on electric power output Wout (M) indicating an upper limit value of electric power discharged therefrom.

Furthermore, control device 30 receives detected values from voltage sensors 10B1, 10B2, temperature sensors 11B1, 11B2 and current sensors 9B1, 9B2 to set an SOC (BB) of the selected sub power storage device BB and upper limits on electric power input and output Win(S) and Wout(S).

Generally, an SOC is indicated by a ratio (%) of each battery's current charged amount to its fully charged state. Furthermore, Win and Wout are indicated as such an upper limit value of electric power that, even when that electric power is discharged for a predetermined period of time (e.g., for approximately 10 seconds), the battery of interest (BA, BB1, BB2) is not overcharged/overdischarged.

Figure 4:
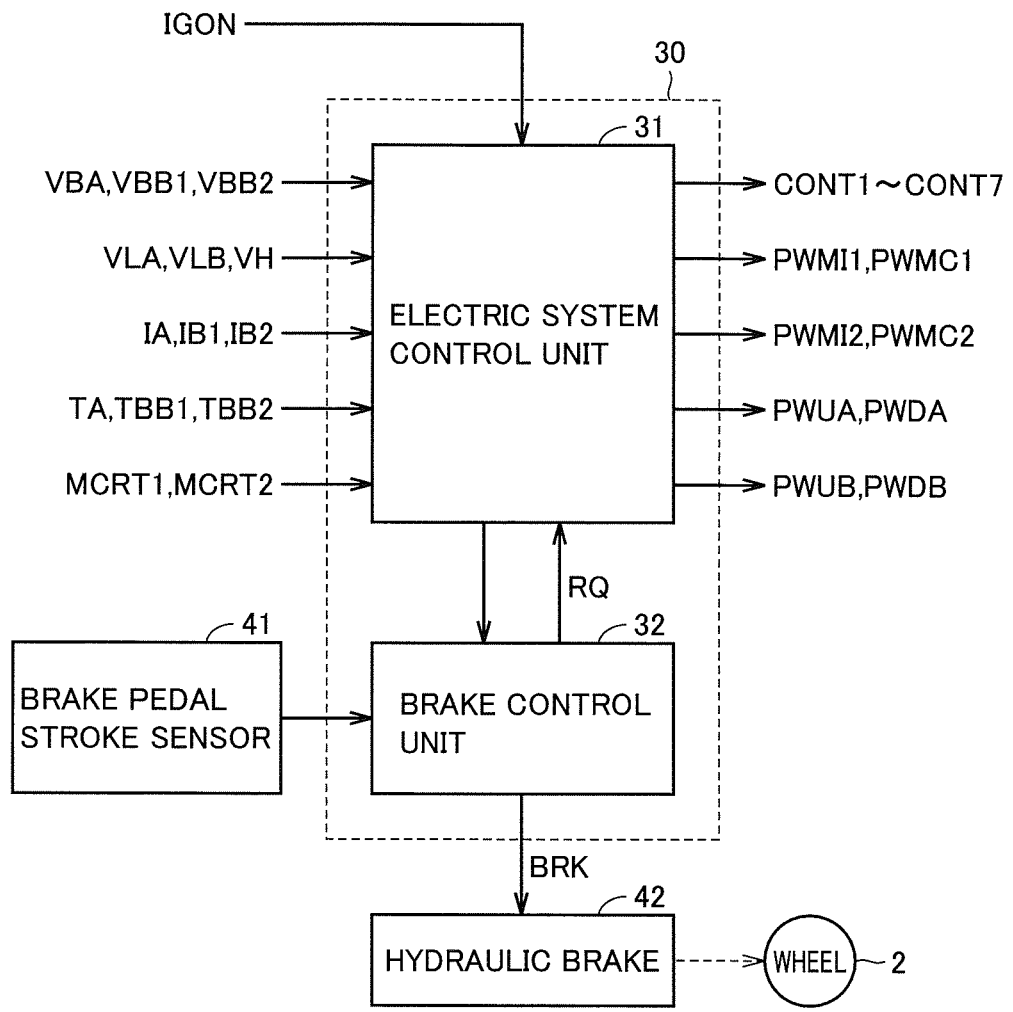
FIG. 4 is a functional block diagram of a control device 30 shown in FIG. 1.

FIG. 4 is a functional block diagram of control device 30 shown in FIG. 1. Each functional block shown in FIG. 4 is to be implemented by execution of a prestored predetermined program by control device 30, and/or an operational process through electronic circuitry (hardware) in control device 30.

Referring to FIG. 4, control device 30 includes an electric system control unit 31 and a brake control unit 32. Electric system control unit 31 provides the generic control of the electric system shown in FIG. 1. Electric system control unit 31 receives each of voltage values VBA, VBB1, VBB2, VLA, VLB, and VH, each of current values IA, IB1, and IB2, each of temperature values TA, TBB1, and TBB2, as well as motor current values MCRT1 and MCRT2. Electric system control unit 31 outputs relay control signals CONT1-CONT7, and control signals PWMI1, PWMC1, PWMI2, PWMC2, PWUA, PWDA, PWUB, and PWDB.

Brake control unit 32 calculates a regenerative brake required level RQ based on a detection result from brake pedal stroke sensor 41 and outputs a signal BRK to hydraulic brake 42. Electric system control unit 31 generates a control signal PWMC2 (regenerative instruction) for controlling inverter 22 based on regenerative brake required level RQ, and outputs control signal PWMC2 to inverter 22. Accordingly, inverter 22 controls motor generator MG2 such that motor generator MG2 executes regenerative braking.

Figure 5:
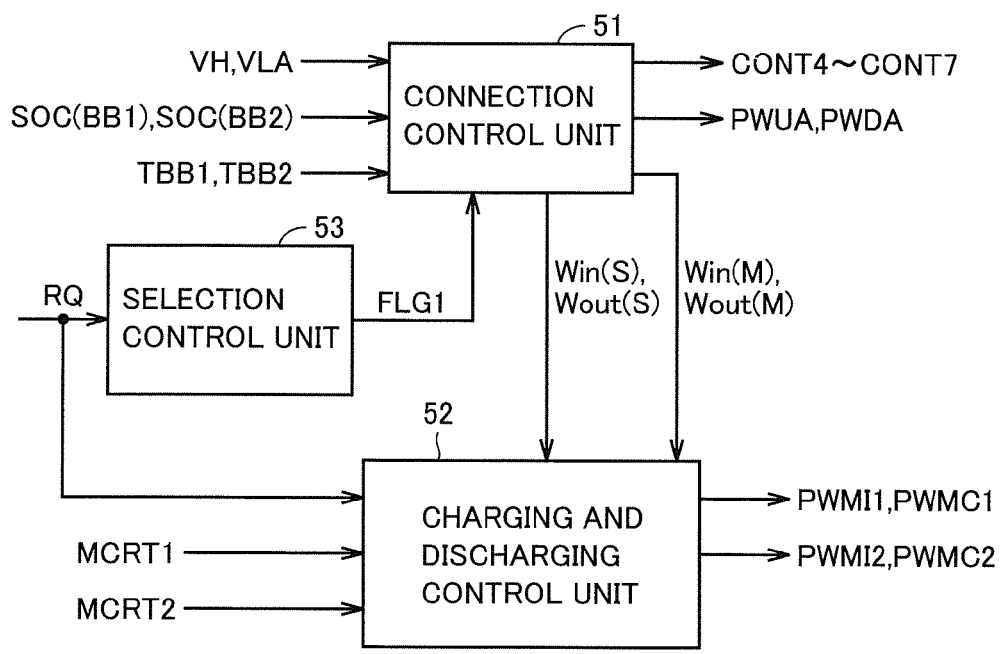
FIG. 5 is a functional block diagram of an electric system control unit 31 shown in FIG. 4.

FIG. 5 is a functional block diagram of electric system control unit 31 shown in FIG. 4. Referring to FIG. 5, electric system control unit 31 includes a connection control unit 51, a charging and discharging control unit 52, and a selection control unit 53.

Connection control unit 51 receives the values of voltages VH, VLA, SOC (BB1), and SOC (BB2) and the values of temperature TBB1 and TBB2. Then, connection control unit 51 outputs signals CONT4-CONT7 and signal PWUA (or PWDA) to switch a sub power storage device and disconnect the selected sub power storage device from converter 12B. The disconnection process of a selected sub power storage device will be described in detail afterwards.

Connection control unit 51 receives a flag FLG1 (disconnection permission flag) indicating permission of disconnection of the selected sub power storage device from converter 12B. When disconnection of the selected sub power storage device is permitted, flag FLG1 takes an ON state. When disconnection of the selected sub power storage device is prohibited, flag FLG1 takes an OFF state. Flag FLG1 is switched between the values of "1" and "0". For example, an ON state and an OFF state corresponds to flag FLG1 taking the value of "1" and "0", respectively.

Connection control unit 51 further outputs Win (M), Wout (M), Win (S), and Wout (S).

Charging and discharging control unit 52 executes the charging and discharging control of the main power storage device and sub power storage device during running of electric powered vehicle 1. Specifically, charging and discharging control unit 52 executes control of power distribution between engine 4 and motor generators MG1, MG2. Charging and discharging control unit 52 receives motor current values MCRT1 and MVCRT2, regenerative brake required level RQ, upper limits on electric power input Win (M), Win (S), and upper limits on electric power output Wout (M), Wout (S) to control the charging and discharging of main power storage device BA and sub power storage devices BB1 and BB2 according to upper limits on electric power input Win (M) and Win (S) or upper limits on electric power output Wout (M) and Wout (S).

Selection control unit 53 sets flag FLG1 at an OFF state when regenerative brake required level RQ is received. In contrast, selection control unit 53 sets flag FLG1 at an ON state when regenerative brake required level RQ is not received (including the case where regenerative brake required level RQ is 0). When disconnection of the selected sub power storage devices is required during an OFF state of flag FLG1, connection control unit 51 waits until flag FLG1 is switched to an ON state from an OFF state for execution of a disconnection process of the selected sub power storage device. In other words, a disconnection process of the selected sub power storage device is prohibited during regenerative braking. The disconnection process is executed after regenerative braking ends.

Figure 6:
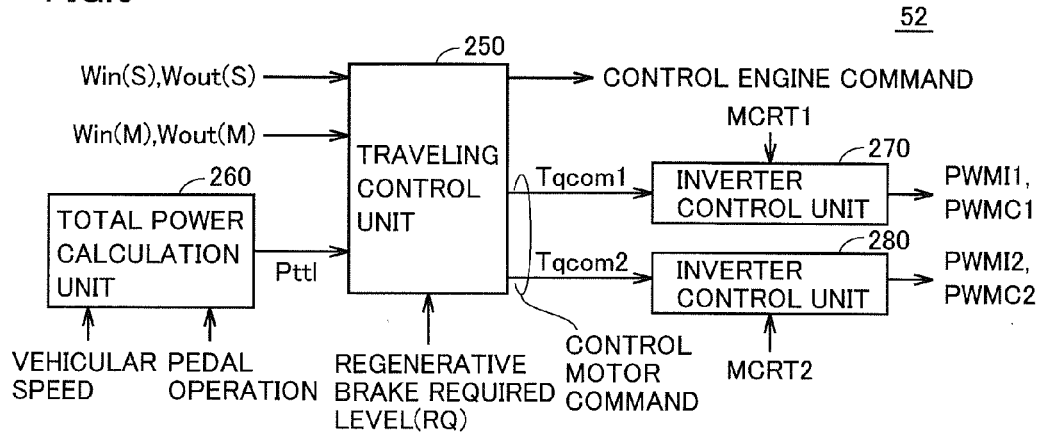
FIG. 6 is a functional block diagram for describing a configuration of a charging and discharging control unit 52 shown in FIG. 5.

FIG. 6 is a functional block diagram for describing a configuration of charging and discharging control unit 52 shown in FIG. 5. Referring to FIG. 6, charging and discharging control unit 52 includes a traveling control unit 250, a total power calculation unit 260, and inverter control units 270 and 280.

Total power calculation unit 260 calculates a total power Pttl required for the entirety of electric powered vehicle 1 based on the vehicular speed and pedal operation (accelerator pedal). Total required power Pttl may also include the power required for generation of battery charging power by motor generator MG1 (engine output), depending on the status of the vehicle.

Traveling control unit 250 receives upper limits on electric power input/output Win (M), Wout (M) of main power storage device BA and upper limits on electric power input/output Win (S), Wout (S) of selected sub power storage device BB, total required power Pttl from total power calculation unit 260, and regenerative brake required level (RQ) corresponding to operation of the brake pedal. Traveling control unit 250 generates torque command values Tqcom1 and Tqcom2 as motor control commands such that the input/output power at motor generators MG1 and MG2 is, in total, within the charging limit (Win (M)+Win (S)) and discharging limit (Wout (M)+Wout (S)) for main power storage device BA and selected sub power storage device BB. The vehicle driving power by motor generator MG2 and the vehicle driving power by engine 4 are dividedly provided to ensure total required power Pttl. In particular, vehicle travel control of high fuel efficiency is realized by suppressing the operation of engine 4 by utilizing the power of the externally-charged battery as much as possible, or by setting the vehicle driving power by engine 4 to correspond to a region where engine 4 is operable at high efficiency.

Inverter control unit 270 receives torque command value Tqcom1 and motor current value MCRT1 of motor generator MG1 to generate control signals PWMI1, PWMC1 for inverter 14. Similarly, inverter control unit 280 receives torque command value Tqcom2 and motor current value MCRT2 of motor generator MG2 to generate control signals PWMI2, PWMC2 for inverter 22. Furthermore, traveling control unit 250 generates a control engine command according to a required value of the vehicle driving power by the engine, as set. Furthermore, a control device (an engine ECU) not shown controls the operation of engine 4 in accordance with the control engine command.

When in a vehicle running mode actively using the battery's electric power (i.e., in an EV mode), and total required power Pttl is equal to or smaller than the batteries' total upper limit on electric power output Wout(M)+Wout(S), engine 4 is not operated and motor generator MG2 alone provides power to drive the vehicle. When total required power Pttl exceeds Wout(M)+Wout(S), engine 4 is started.

In contrast, when in a running mode in which the EV mode is not selected, i.e., in an HV mode, distribution of driving power between engine 4 and motor generator MG2 is controlled such that the batteries' SOC is maintained at a predetermined target value. In other words, the vehicle is controlled to run with engine 4 in a more operable manner than in the EV mode.

In the present embodiment, control device 30 determines whether switching of the running mode from the EV mode to the HV mode is required or not based on the average value of the SOC of main power storage device BA and the SOC of selected sub power storage device BB (hereinafter, simply referred to as "SOC average value"). Specifically, control device 30 determines that switching from the EV mode to the HV mode is required when the SOC average value becomes lower than a predetermined threshold value.

In the EV mode, charging and discharging are controlled to preferentially use the electric power of selected sub power storage device BB than that of main power storage device BA. Therefore, when the SOC of selected sub power storage device BB is decreased during vehicle traveling, there is a need to switch selected sub power storage device BB. For example, if battery BB1 is set as selected sub power storage device BB in starting the vehicle, a necessity will arise to subsequently disconnect battery BB1 from converter 12B and connect battery BB2 as a new selected sub power storage device BB to converter 12B, i.e. to form a connection switching process.

Battery BB2 newly qualified as selected sub power storage device BB generally has an output voltage higher than that of battery BB1 that is previously used.

There is a possibility of different output voltages between main power storage device BA and the currently selected sub power storage device BB even before selected sub power storage device BB is switched.

In the present embodiment, at least one of converters 12A and 12B carries out a stepping up voltage operation such that voltage VH becomes higher than the voltage (VBA, VBB) of the power storage device when both the main power storage device and selected sub power storage device are used, and when selected sub power storage device BB is switched. Accordingly, short-circuiting between the main power storage device and selected sub power storage device can be prevented.

From the standpoint of control of motor generators MG1 and MG2, the lower limit of voltage VH is restricted. Specifically, voltage VH is preferably set higher than the induced voltage of motor generators MG1 and MG2. Therefore, in practice, voltage VH is controlled to become higher than the lower limit based on the batteries limit and the lower limit based on motor control.

In a mode in which both the main power storage device and selected sub power storage device can be used, converters 12A and 12B must perform a stepping up voltage operation in order to meet the lower limit based on the batteries limit even in the case where voltage VH may be decreased from the motor control aspect, typically in the case where stepping up by converters 12A and 12B is not required.

If the connection by a relay is maintained even after both batteries BB1 and BB2, i.e. all the sub power storage devices, are depleted, there is a possibility of a short-circuiting path being formed between battery BA and batteries BB1, BB2 via diode D1 of converter 12B and electric power feeding line PL2. Therefore, in the power supply system of the present embodiment, all sub power storage devices are electrically disconnected from the power supply system when there is no more sub power storage device that can be used.

Since voltage step-up from the battery restricted aspect is dispensable, power loss at converter 12A can be reduced by holding the upper arm of converter 12A at an ON state when voltage step-up by converter 12A is not required. Accordingly, the efficiency of the converter is improved, which in turn leads to relative improvement of the fuel efficiency of electric powered vehicle 1.

A process of disconnecting a selected sub power storage device from converter 12B will be specifically described hereinafter.

Figure 7:
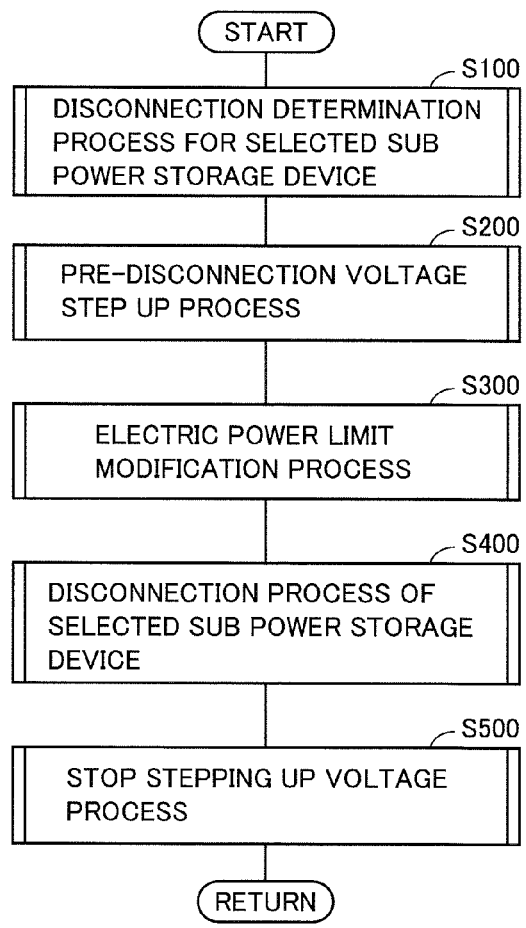
FIG. 7 is a flowchart of a general procedure of a selected sub power storage device disconnection process at a power supply system in an electric powered vehicle according to an embodiment of the present invention.

FIG. 7 is a flowchart of a general procedure of a selected sub power storage device disconnection process in a power supply system of an electric powered vehicle according to an embodiment of the present invention. FIGS. 8-12 are flowcharts for describing in detail steps S100, S200, S300, S400 and S500, respectively, of FIG. 7.

Control device 30 (connection control unit 51) can repeatedly execute the control process procedure according to the flowcharts of FIGS. 8-12 periodically as predetermined by executing a prestored predetermined program periodically as predetermined. Accordingly, a disconnection process of a selected sub power storage device in the power supply system of the electric powered vehicle according to an embodiment of the present invention can be realized.

Referring to FIG. 7, control device 30 executes a disconnection determination process of the selected sub power storage device at step S100. When determination is made that disconnection of the selected sub power storage device is required, steps S200-S500 set forth below is executed. When determination is made that disconnection of the selected sub power storage device is not required at step S100, steps S200-S500 are substantially not executed.

Control device 30 executes a pre-disconnection voltage step-up process at step S200, and executes an electric power limit modification process at step S300 such that an excessive charging/discharging request is not generated to the power supply system during a disconnection period of a selected sub power storage device. Control device 30 executes a process of actually disconnecting selected sub power storage device BB from converter 12B at step S400. At step S500, control device 30 executes a stop-stepping-up-voltage process to stop the voltage step-up process executed at step S200.

Figure 8:
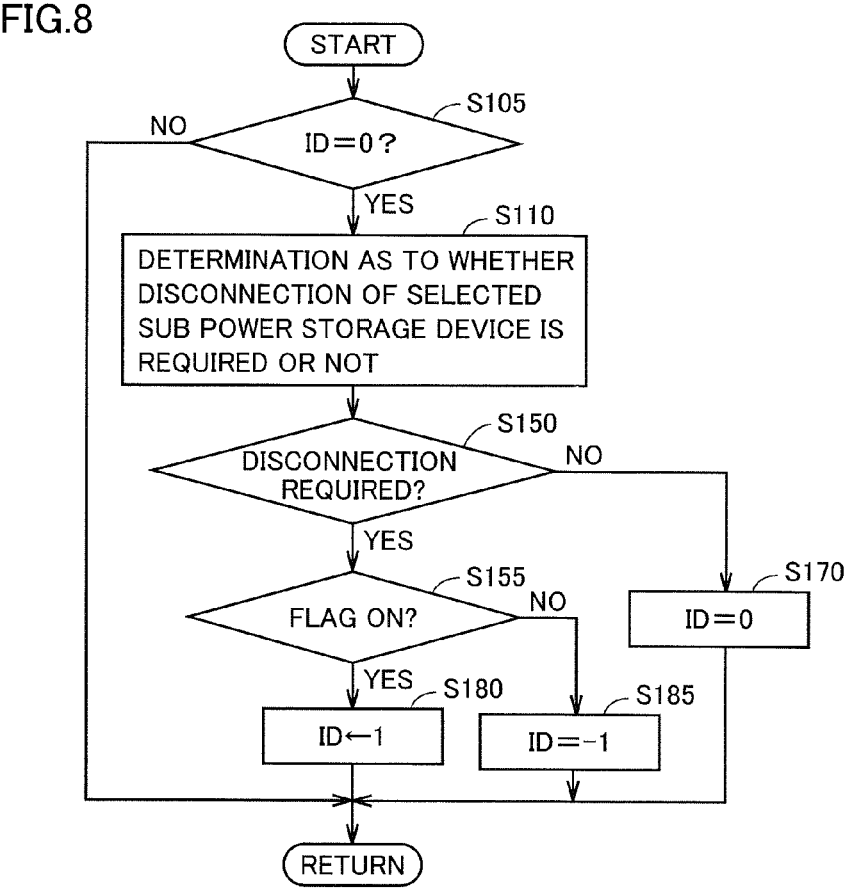
FIG. 8 is a flowchart for describing in detail the selected sub power storage device disconnection process shown in FIG. 7.

FIG. 8 is a flowchart for describing in detail a disconnection determination process (S100) of the selected sub power storage device shown in FIG. 7.

A variable ID representing the progress status of a disconnection process is introduced, as set forth below. Variable ID is set to −1 or any of 0 to 4.

ID=0 represents a state in which a disconnection request of a selected sub power storage device is not generated. Specifically, when ID=0, power supply by a currently selected sub power storage device BB is executed while determination as to whether selected sub power storage device BB is to be disconnected or not is made periodically as predetermined. When disconnection of selected sub power storage device BB is prohibited such as when sufficient power cannot be supplied to motor generators MG1 and MG2 with the main power storage device alone, or in the event of failure in connection unit 39B, ID=−1 will be set.

Referring to FIG. 8, control device 30 first determines whether ID=0 or not at step S105. When ID=0 (YES at step S105), control device 30 proceeds to step S110 to execute determination as to whether disconnection of the selected sub power storage device is required or not. Determination is made that disconnection of the selected sub power storage device is required when the SOC of the selected sub power storage device currently used is lower than a predetermined determination value (threshold value) and there is no longer a new sub power storage device that can replace the current selected sub power storage device.

At step S150, control device 30 confirms the determination result of whether disconnection is required or not made at step S110. When determination is made that disconnection is required (YES at step S150), control device 30 proceeds to step S155 to determine whether flag FLG1 (disconnection permission flag) is ON or not. When flag FLG1 is ON (YES at step S155), control device 30 proceeds to step S180 to set ID=1 to proceed with the disconnection process. In other words, ID=1 represents the state in which a disconnection request of selected sub power storage device BB is generated and a disconnection process is started.

When determination is made that disconnection of the selected sub power storage device is not required at step S150 (NO at step S150), control device 30 proceeds to step S170 to maintain ID=0. When determination is made at step S155 that flag FLG1 is OFF (NO at step S155), control device 30 proceeds to step S185 to set ID=−1.

When ID≧1 and a disconnection process is started, or when ID=−1 is set since switching of the selected sub power storage device is prohibited (NO at step S105), the processes of steps S110-S180 are skipped.

Figure 9:
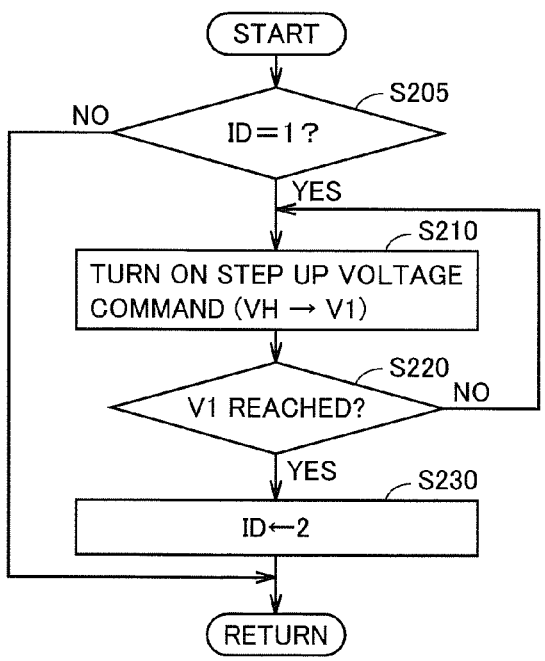
FIG. 9 is a flowchart for describing in detail a pre-disconnection voltage step-up process shown in FIG. 7.

FIG. 9 is a flowchart for describing in detail a pre-disconnection voltage step-up process (S200) shown in FIG. 7.

Referring to FIG. 9, control device 30 confirms whether ID=1 at step S205 in the pre-disconnection voltage step-up process. When ID=1 corresponding to a state where a disconnection request of selected sub power storage device BB is made and a disconnection process is started (YES at step S205), control device 30 proceeds to step S210 to generate a step-up voltage command for converter 12A such that voltage VH at electric power feeding line PL2 is stepped up to a predetermined voltage V1. In response to the step-up voltage command, voltage command value VHref=V1 is set for electric power feeding line PL2, and a control signal PWUA for converter 12A is generated to realize the relevant voltage command value.

Predetermined voltage V1 is set higher than any higher one of the output voltages from main power storage device BA and selected sub power storage device BB (for example BB2). By setting predetermined voltage V1 at a controlled upper limit voltage VHmax that can be stepped up by converter 12A, for example, voltage VH at the time of voltage step-up command can be reliably set higher than the output voltages from both main power storage device BA and selected sub power storage device BB subsequent to switching. Alternatively, from the standpoint of reducing loss at converter 12A, predetermined voltage V1 may be determined on a case-by-case basis to have a margin relative to the output voltages of main power storage device BA and selected sub power storage device BB at that point of time.

When a voltage step-up command is generated at step S210, control device 30 proceeds to step S220 to determine whether voltage VH has reached predetermined voltage V1 based on the sensed value of voltage sensor 13. For example, a YES determination is made at step S220 when VH≧V1 continues for a predetermined time.

When voltage VH reaches predetermined voltage V1 (YES at S220), control device 30 advances the ID to 2 from 1. Until voltage VH reaches the level of V1 (NO at step S220), ID=1 is maintained. Specifically, ID=2 represents a state in which the pre-disconnection voltage step-up process has ended and the disconnected process can further proceed. When ID≠1 (NO at step S205), the subsequent processes of steps S210-S230 are skipped.

Figure 10:
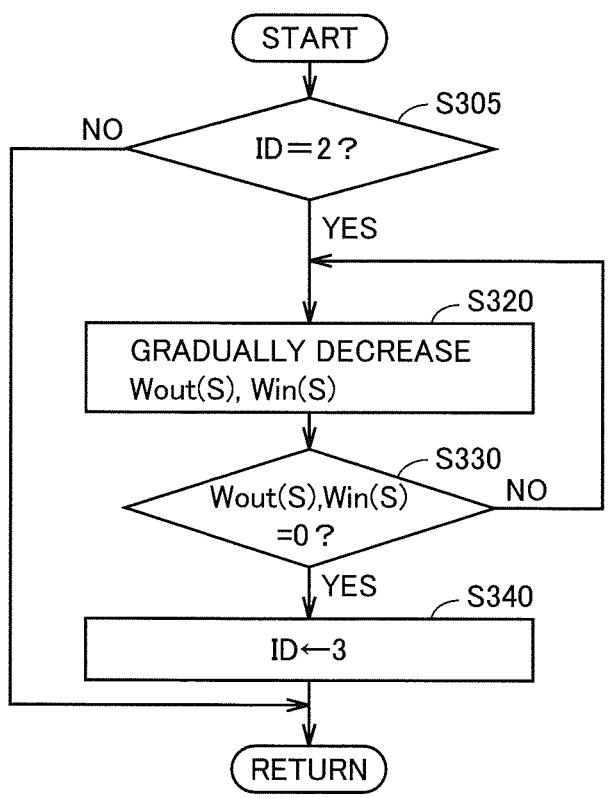
FIG. 10 is a flowchart for describing in detail an electric power limit modification process shown in FIG. 7.

When the pre-disconnection voltage step-up process (step S200) ends, control device 30 executes an electric power limit modification process shown in FIG. 10.

FIG. 10 is a flowchart for describing in detail an electric power limit modification process (S300) shown in FIG. 7.

Referring to FIG. 10, control device 30 in the electric power limit modification process first determines whether ID=2 at step S305. When not at ID=2 (NO at step S305), the processes of subsequent steps S320-S340 are skipped.

When ID=2 (YES at step S305), control device 30 proceeds to step S320 to gradually decrease the absolute values of upper limits on electric power input/output Win (S) and Wout (S) of selected sub power storage device BB. For example, Wout (S) and Win (S) are gradually decreased towards 0 according to a predetermined fixed rate. If Wout (S) and Win (S) are decreased in a stepped manner, the upper limit of the torque of motor generator MG2 (power running torque and regenerative torque) is lowered intermittently. In other words, there is a possibility of the torque of motor generator MG2 being suddenly limited. If such a behavior of motor generator MG2 is conveyed to the drive shaft, there is a possibility of affecting the vehicle behavior such as vibration at the vehicle.

In the present embodiment, the upper limit of the torque of motor generator MG2 can be decreased smoothly by gradually reducing the absolute values of Wout (S) and Win (S) at a predetermined fixed rate. Since sudden limitation on the torque of motor generator MG2 can be avoided, the aforementioned effect on the vehicle behavior can be impeded.

Further, the upper limit of the torque in a regenerative braking mode of motor generator MG2 also can be decreased smoothly by gradually reducing the absolute values of Wout (S) and Win (S) according to predetermined fixed rate. The reduction in the braking force caused by a lower regenerative torque of motor generator MG2 can be compensated for by increasing the braking force by the hydraulic brake. Accordingly, the change in the user's impression during a braking mode of the electric powered vehicle can be prevented.

Control device 30 proceeds to step S330 to determine whether Wout (S) and Win (S) have reached 0 or not. Step S320 is repeatedly executed until Wout (S)=Win (S)=0 is achieved, so that Wout (S) and Win (S) are continuously decreased.

When Wout (S) and Win (S) reach 0 (YES at S330), control device 30 proceeds to step S340 to set the ID to 3 from 2. In other words, ID=3 represents the state in which the pre-disconnection voltage step-up process and electric power limit modification process have ended and selected sub power storage device BB can be disconnected from converter 12B.

When the electric power limit modification process shown in FIG. 10 ends, control device 30 proceeds to step S400 to execute a sub power storage device disconnection process.

Figure 11:
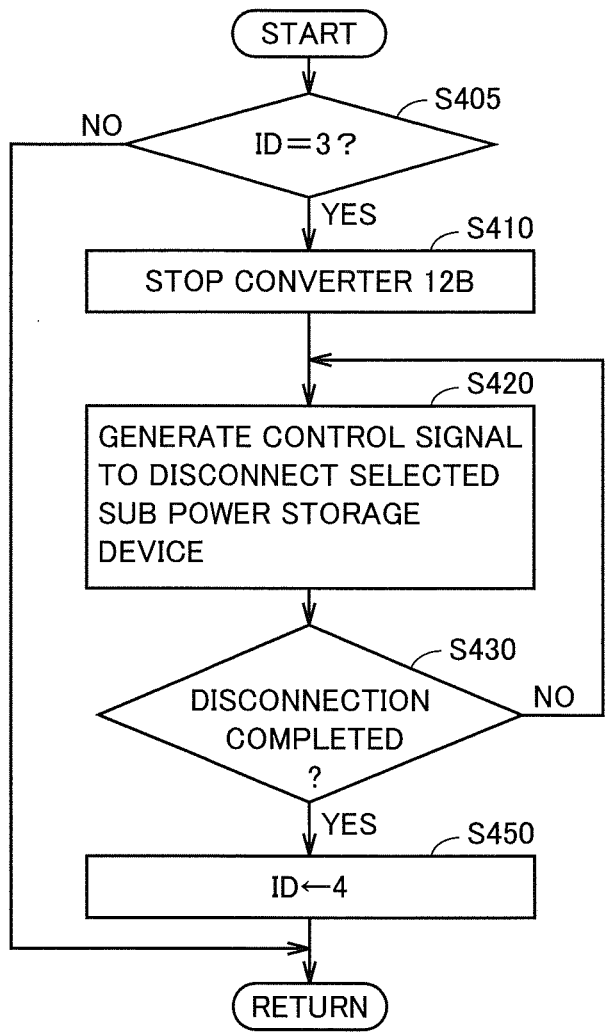
FIG. 11 is a flowchart for describing in detail the selected sub power storage device disconnection process shown in FIG. 7.

FIG. 11 is a flowchart for describing in detail the sub power storage device disconnection process (S400) shown in FIG. 7.

Referring to FIG. 11, control device 30 in a sub power storage device disconnection process first determines whether ID=3 at step S405. When ID≠3 (NO at S405), the processes of subsequent steps S410-S450 are skipped.

When ID=3 (YES at S405), control device 30 proceeds to step S410 to cause converter 12B to stop as a preparation for disconnecting a sub power storage device. In other words, converter 12B responds to a shutdown command to force IGBT devices Q1 and Q2 to be turned off.

Control device 30 proceeds to step S420 to generate a relay control signal to disconnect a selected sub power storage device from converter 12B. For example, when sub power storage device BB2 is the selected sub power storage device, control device 30 generates relay control signals CONT5 and CONT7 such that relays SR2 and SR2G are turned off.

Further, control device 30 proceeds to step S430 to determine whether the disconnection has been completed or not. When disconnection is completed (YES at S430), control device 30 proceeds to step S450 to set the ID to 4 from 3.

In other words, ID=4 represents the state in which cutting the connection between a sub power storage device and converter 12B is completed.

When the disconnection process of step S400 ends, control device 30 executes a stop-stepping-up-voltage process by step S500.

Figure 12:
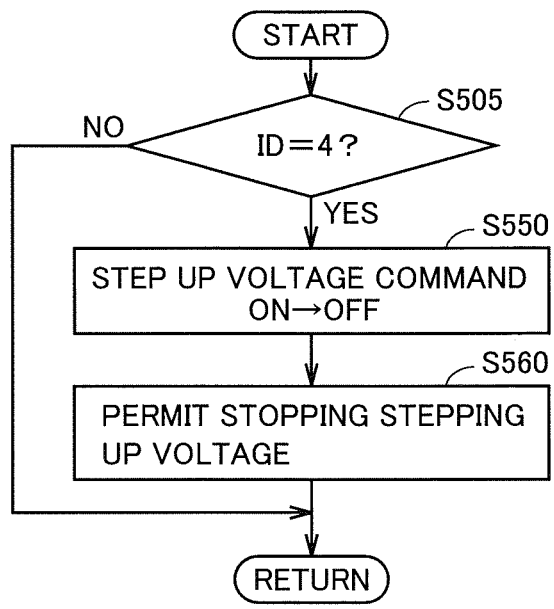
FIG. 12 is a flowchart for describing in detail a stop-stepping-up-voltage process shown in FIG. 7.

FIG. 12 is a flowchart for describing in detail a stop-stepping-up-voltage process (S500) shown in FIG. 7.

Referring to FIG. 12, control device 30 in a stop-stepping-up-voltage process first determines whether ID=4 or not at step S505. When ID≠4 (NO at step S505), the processes of steps S505 and et seq. are skipped.

When ID=4 (YES at step S505), control device 30 proceeds to step S550 to turn off the voltage step-up command generated at step S210. Then, control device 30 proceeds to step S560 to permit stopping a voltage step-up by converter 12A. When voltage step-up by converter 12A is not required for the standpoint of fuel efficiency of the power storage device or the like, the voltage step-up operation by converter 12A is stopped. In this case, converter 12A has the upper arm and lower arm held at ON and OFF, respectively.

Figure 13:
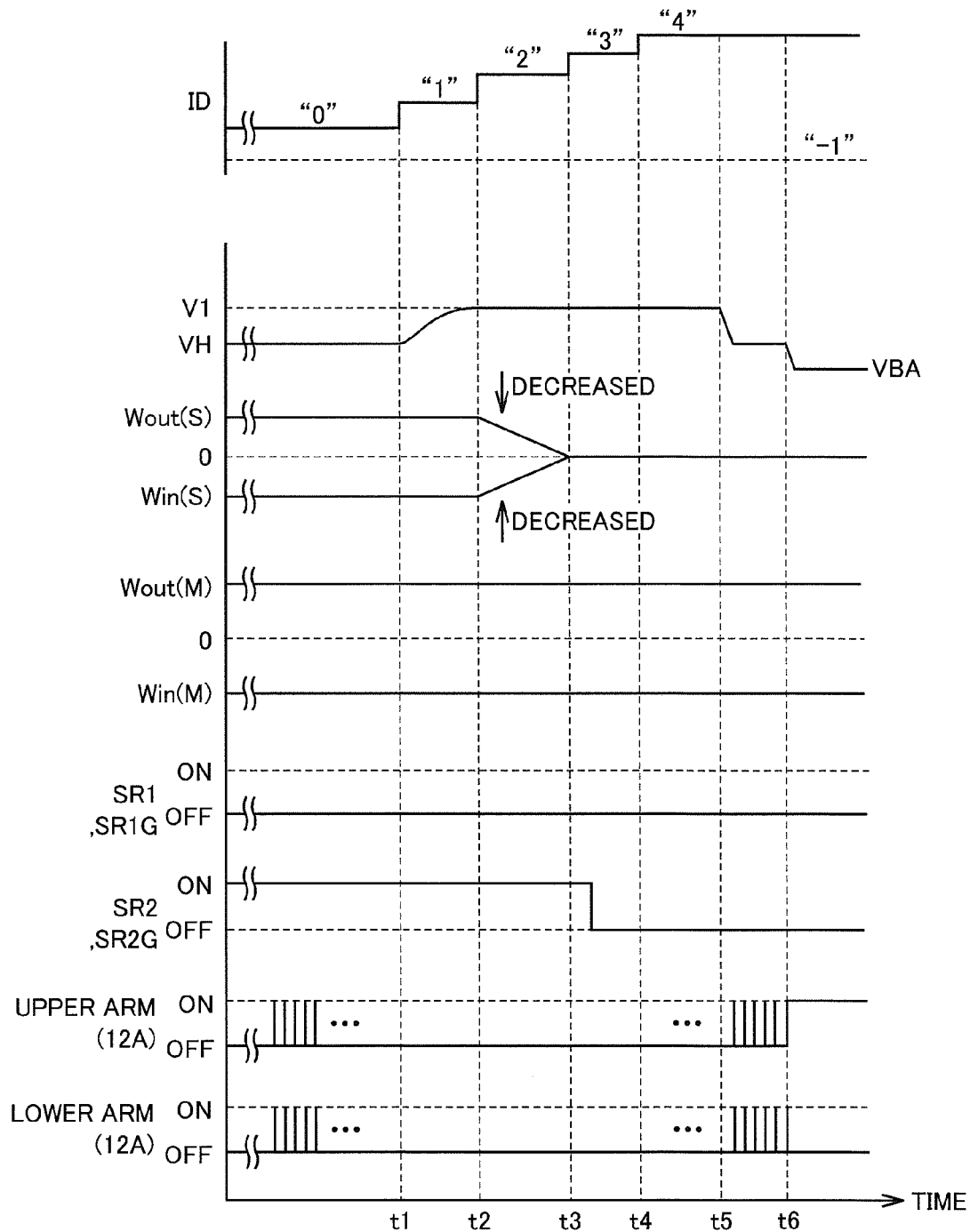
FIG. 13 is an operation waveform diagram in a selected sub power storage device disconnection process at a power supply system of an electric powered vehicle according to an embodiment of the present invention.

FIG. 13 represents an operation waveform diagram of a selected sub power storage device disconnection process in a power supply system of an electric powered vehicle according to an embodiment of the present invention described with reference to FIGS. 7-12.

Referring to FIG. 13, a disconnection determination process is executed periodically as predetermined based on the SOC of the sub power storage device currently selected (for example, battery BB2) before time t1 where ID=0.

At time t1, a disconnection request of selected sub power storage device BB is issued by the disconnection determination process (step S100) in response to reduction in the SOC of selected sub power storage device BB. A disconnection process is initiated by the setting of ID=1.

Accordingly, a pre-disconnection voltage step-up process (step S200) is executed. Voltage VH at electric power feeding line PL2 is stepped up towards predetermined voltage V1 by converter 12A. When the voltage step-up process of electric power feeding line PL2 is completed at time t2, the ID is modified from 1 to 2.

When ID=2, an electric power limit modification process (S300) is executed. The upper limits on electric power input/output Win (S) and Wout (S) of selected sub power storage device BB are gradually decreased towards 0 at a fixed rate. During this period, converter 12B is controlled such that the charging/discharging of the sub power storage device currently selected (battery BB1) is stopped. Alternatively, converter 12B may be shut down from time t1.

When the upper limits on electric power input/output Win (S) and Wout (S) of selected sub power storage device BB are lowered down to 0 at time t3, the ID is modified from 2 to 3.

When ID=3, a selected sub power storage device disconnection process is initiated. In other words, relays SR2 and SR2G are turned off with converter 12B in a shut-down state. By completion of such a disconnection process, the ID is modified from 3 to 4 at time t4.

When ID=4, a step-up process to boost voltage VH of electric power feeding line PL2 to the level of predetermined voltage V1 is stopped at time t5. Thus, a selected sub power storage device disconnection process ends. Upper limits on electric power input/output Win (M), Wout (M) of main power storage device BA are not modified by a selected sub power storage device disconnection process.

At time t6, stopping the stepping up of the voltage by converter 12A is permitted. When voltage step-up by converter 12A is not required, the switching operation of converter 12A is suspended from time t6 and et seq., as shown in FIG. 13. Namely, from time t6 onwards, converter 12A has the upper arm and the lower arm held at ON and OFF, respectively. In this case, the level of voltage VH is decreased down to voltage VBA of main power storage device BA. When voltage step-up by converter 12A is required, the switching operation of converter 12A is continued even after time t6.

FIGS. 7-13 represent a portion of the configuration of connection control unit 51 shown in FIG. 5. A configuration of the functional element for a disconnection process of a selected sub power storage device described with reference to FIGS. 7-13 is set forth below. Each functional block of FIG. 14 is implemented by control device 30 through software processing caused by execution of a predetermined program, or by dedicated electronic circuitry (hardware process).

Figure 14:
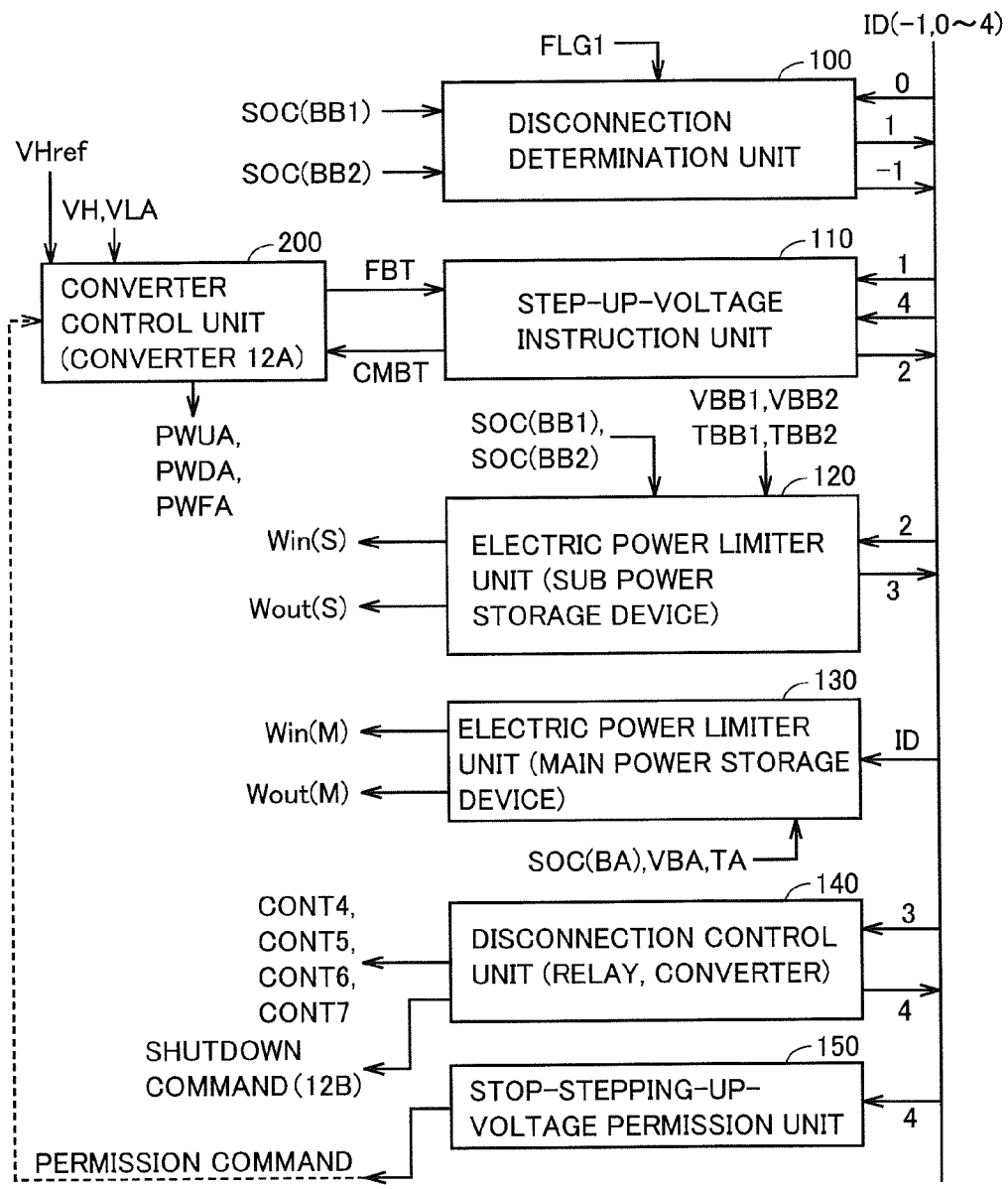
FIG. 14 is a functional block diagram for describing the functional element, among the configuration of connection control unit 51 shown in FIG. 5, for a disconnection process of a selected sub power storage device.

Referring to FIG. 14, disconnection determination unit 100 receives flag FLG1 as well as SOC (BB1), SOC (BB2) representing the state of charge of batteries BB1 and BB2. When variable ID shared by the functional blocks is 0, disconnection determination unit 100 determines whether the SOC of selected sub power storage device BB currently used is lower than a predetermined threshold value. Further, disconnection determination unit 100 determines whether there is any new sub power storage device left, that can replace the selected sub power storage device currently used based on SOC (BB1), SOC (BB2). The determination process set forth above is executed periodically as predetermined.

When there is no new stop power storage device that can replace the selected sub power storage device currently used, disconnection determination unit 100 determines whether disconnection of selected sub power storage device BB from converter 12B is required or not based on the state of charge SOC (BB) of the selected sub power storage device. When disconnection of the selected sub power storage device is required and flag FLG1 is ON, disconnection determination unit 100 modifies the ID to 1 from 0. Accordingly, a disconnection request of a selected sub power storage device is generated. When flag FLG1 is OFF, disconnection determination unit 100 sets the ID to −1. In other words, the function of disconnection determination unit 100 corresponds to the process of step S100 in FIG. 7.

When a disconnection request of a selected sub power storage device is generated to attain ID=1, step-up voltage instruction unit 110 outputs a voltage step-up command signal CMBT to converter control unit 200 controlling converter 12A.

Converter control unit 200 generates control signals PWUA and PWDA for converter 12A such that voltage VH at electric power feeding line PL2 attains the level of voltage command value VHref based on voltages VH and VLA as well as voltage command value VHref.

When a voltage step-up command signal CMBT is generated from step-up voltage instruction unit 110, converter control unit 200 sets voltage command value VHref=V1 to generate control signal PWUA. Converter control unit 200 sets flag FBT indicating voltage step-up completion at an ON state when the state of voltage VH detected by voltage sensor 13 reaching the level of predetermined voltage V1 continues for more than a predetermined period.

Step-up voltage instruction unit 110 modifies the ID to 2 when flag FBT is ON. An output of voltage step-up command signal CMBT is continued until ID=4 is set by the completion of a disconnection process by disconnection control unit 140, described afterwards. In other words, the function of step-up voltage instruction unit 110 corresponds to step S200 in FIG. 7 and step S550 in FIG. 12.

Electric power limiter unit 120 sets upper limits on electric power input/output in Win (S) and Wout (S) of selected sub power storage device BB. In a normal mode, upper limits on electric power input/output Win (S) and Wout (S) are set based on the SOC of the battery identified as selected sub power storage device BB (SOC (BB1) or SOC (BB2)), the battery temperature (TBB1 or TBB2), and the output voltage (VBB 1 or VBB2).

When ID=2 in a selected sub power storage device disconnection process, electric power limiter unit 120 gradually decreases upper limits on electric power input/output Win (S) and Wout (S) towards 0 at a fixed rate, and modifies the ID to 3 from 2 when upper limits on electric power input/output Win (S) and Wout (S) reach 0. When the ID attains 3, electric power limiter unit 120 holds upper limits on electric power input/output Win (S) and Wout (S) at 0. In other words, the function of electric power limiter unit 120 corresponds to the processes of steps S320-S340 in FIG. 10.

Electric power limiter unit 130 sets upper limits on electric power input/output Win (M) and Wout (M) of main power storage device BA. The upper limits on electric power input/output Win (M) and Wout (M) are set based on the SOC (BA) of main power storage device BA, temperature TA, and voltage VBA.

Disconnection control unit 140 generates a shut-down command for converter 12B when ID=3 is set by electric power limiter unit 120. Disconnection control unit 140 also generates relay control signals CONT4-CONT7 such that selected sub power storage device BB is disconnected from converter 12B. For example, when selected sub power storage device BB is battery BB2, relay control signals CONT5 and CONT7 are generated such that relays SR2 and SR2G are turned OFF. When this disconnection process is completed, disconnection control unit 140 ends the shutdown state of converter 12B and modifies the ID to 4 from 3. In other words, the function of disconnection control unit 140 corresponds to the process of step S400 of FIG. 11.

When ID=4 is set by disconnection control unit 140, stop-stepping-up-voltage permission unit 150 generates a command to permit stopping the voltage step-up operation by converter 12A, and outputs that command. In other words, the function of stop-stepping-up-voltage permission unit 150 corresponds to the process of step S560 in FIG. 12. Converter control unit 200 generates a control signal PWFA to hold the upper arm of converter 12A at an ON state in response to a command from stop-stepping-up-voltage permission unit 150.

Figure 15:
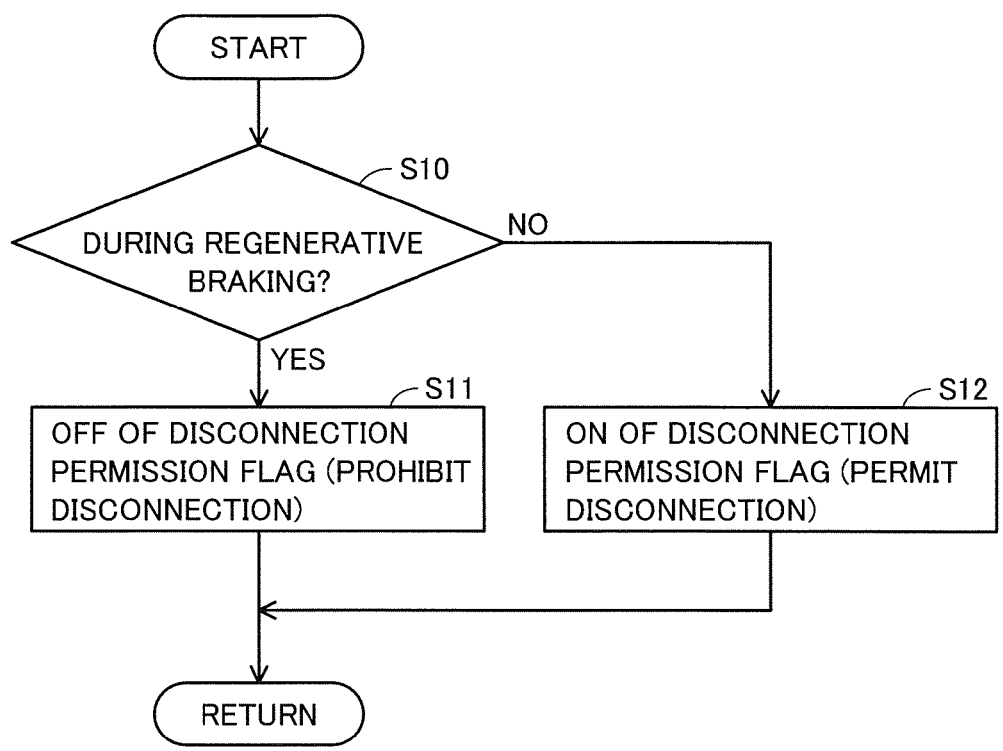
FIG. 15 is a flowchart for describing a flag setting process by selection control unit 53 of FIG. 5.

FIG. 15 is a flowchart to describe a flag setting process by selection control unit 53 of FIG. 5. Control device 30 (selection control unit 53) can repeatedly execute the control process procedure according to the flowchart of FIG. 15 periodically as predetermined by executing a prestored predetermined program periodically as predetermined.

Referring to FIG. 15, selection control unit 53 determines whether a regenerative braking of motor generator MG2 is currently executed or not at step S10. Selection control unit 53 determines that regenerative braking of motor generator MG2 is currently executed when regenerative brake required level RQ takes a value other than 0, and determines that regenerative braking of motor generator MG2 is not executed when regenerative brake required level RQ is 0. When determination is made that regenerative braking is currently executed (YES at step S10), selection control unit 53 proceeds to step S11 to set flag FLG1 (disconnection permission flag) OFF. In other words, selection control unit 53 prohibits disconnection of the selected sub power storage device. When determination is made that regenerative braking is not executed (NO at step S10), selection control unit 53 proceeds to step S12 to set flag FLG1 at an ON state. In other words, selection control unit 53 permits disconnection of the selected sub power storage device.

In the first embodiment, a selected sub power storage device disconnection process is prohibited during execution of regenerative braking. Accordingly, stable regenerative braking can be realized. This will be described in detail.

Figure 16:
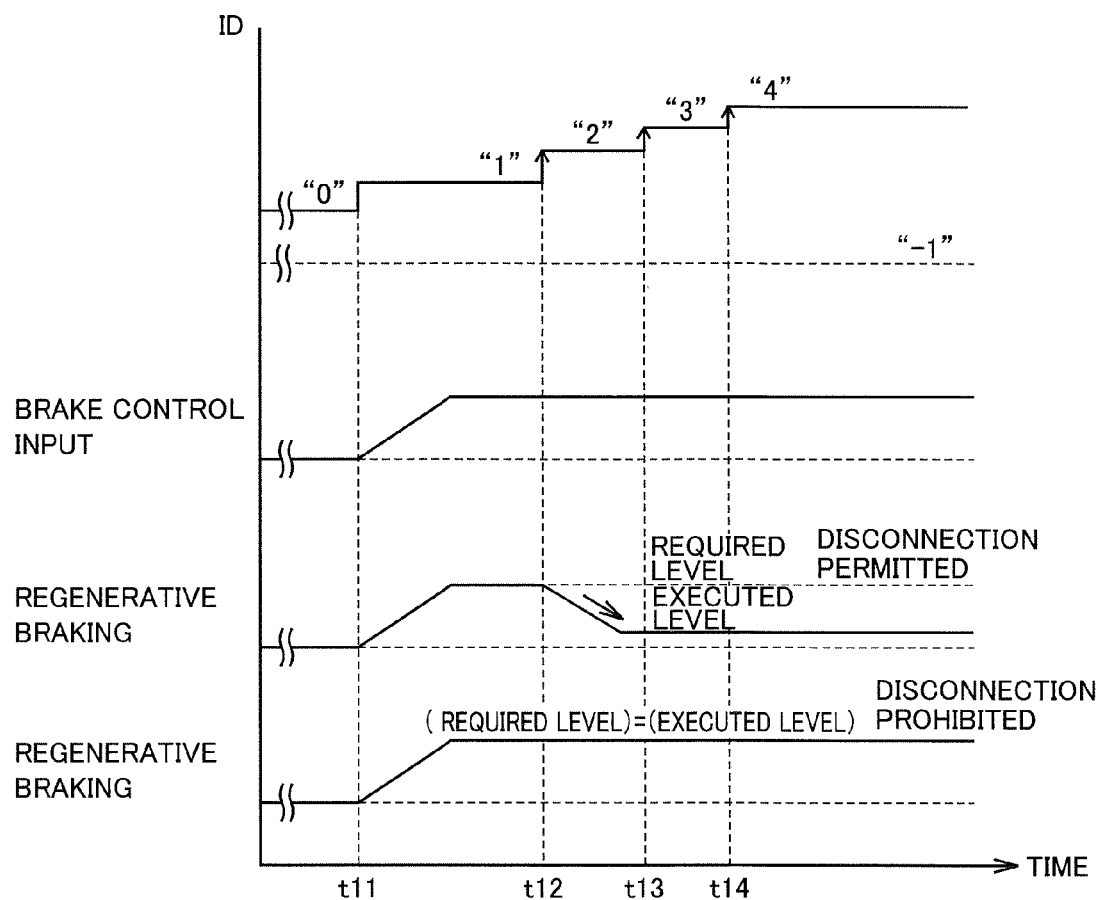
FIG. 16 is a diagram for describing the relationship between a brake control input by the user and an executed level of regenerative braking.

FIG. 16 is a diagram to describe the relationship between the brake control input by the user and the executed level of regenerative braking. Referring to FIG. 16, it is assumed that the user operates the brake pedal during the period of ID=1 (the period from time t11 to time t12). It is assumed that the brake pedal control input is increased from time t11 and maintained at a certain value.

When ID≧2, the executed level of regenerative braking becomes lower since the upper limit on electric power input of selected sub power storage device BB is decreased. Specifically, during the period of ID=2 (the period from time t12 to time t13), the absolute values of upper limits on electric power input/output (Win (S), Win (M)) of selected sub power storage device BB are gradually decreased. Accordingly, the executed level of regenerative braking is gradually decreased. The upper limits on electric power input/output of selected sub power storage device BB are set to 0 during the period of ID=2. At time t13, ID=3 is established. Accordingly, selected sub power storage device BB is disconnected from converter 12B. At time t14, ID=4 is established. By setting the upper limits on electric power input/output of selected sub power storage device BB to 0, only main power storage device BA can receive the electric power by the regenerative braking of motor generator MG2.

When the executed level of the regenerative brake is reduced with the braking force of the hydraulic brake not altered, the braking force of the electric powered vehicle will become lower. One possible approach to prevent such a problem is to increase the braking force by the hydraulic brake in accordance with reduction in the executed level of regenerative braking. However, the response of the hydraulic brake is generally lower as compared to regenerative braking. Therefore, in the case where the absolute value of the rate of change of the upper limit on electric power input/output is large as compared to the rate of increase of the braking force by the hydraulic brake, there is a possibility of the driver having the impression of weaker brake efficiency, for example.

In the first embodiment, selection control unit 53 sets flag FLG1 at an OFF state in a regenerative braking mode by motor generator MG2 (when motor generator MG2 generates power). Accordingly, disconnection of the selected sub power storage device is prohibited since ID=−1 is set.

The prohibition of disconnecting the selected sub power storage device allows both the main power storage device and selected sub power storage device to receive the electric power corresponding to the regenerative brake required level. Therefore, the regenerative brake executed level can be set to match the regenerative brake required level. In other words, brake control of a normal braking mode is executed. According to the first embodiment, any adverse effect of a sub power storage device disconnection process on the braking of the electric powered vehicle can be prevented.

Second Embodiment

Referring to FIG. 1, an electric powered vehicle 1A according to a second embodiment of the present invention differs from electric powered vehicle 1 in that a control device 30A is incorporated instead of control device 30. The configuration of the remaining elements of electric powered vehicle 1A is similar to the configuration of the corresponding elements in electric powered vehicle 1. Therefore, control device 30A will be described in detail hereinafter.

Figure 17:
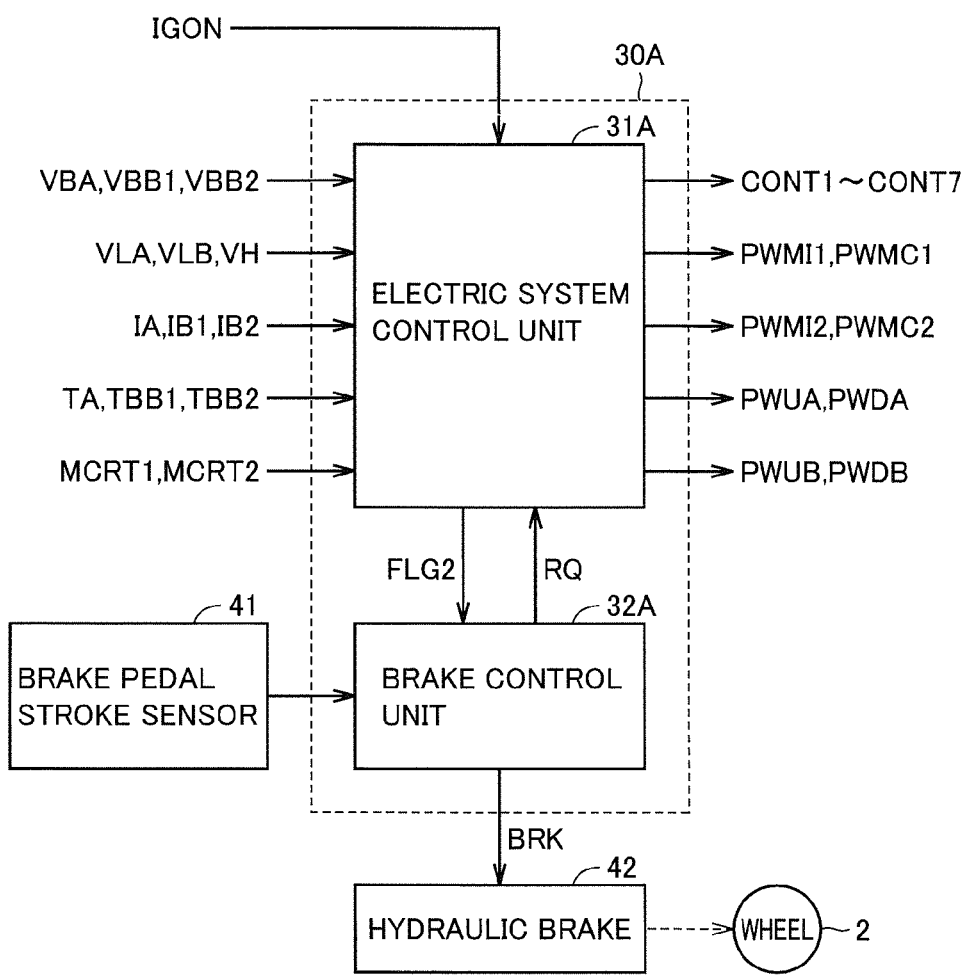
FIG. 17 is a functional block diagram for describing a configuration of a control device 30A incorporated in an electric powered vehicle according to a second embodiment.

FIG. 17 is a functional block diagram for describing a configuration of control device 30A incorporated in the electric powered vehicle according to the second embodiment. It is assumed that each functional block shown in FIG. 17 is implemented by execution of a prestored predetermined program by control device 30A and/or by an operational process through electronic circuitry (hardware) in control device 30A.

Referring to FIG. 17, control device 30A includes an electric system control unit 31A, and a brake control unit 32A. Electric system control unit 31A sets flag FLG2 at an OFF state during a selected sub power storage device disconnection process, and provides that flag FLG2 to brake control unit 32A. Electric system control unit 31A provides generic control of the electric system of electric powered vehicle 1A shown in FIG. 1.

When flag FLG2 is OFF, brake control unit 32A sets regenerative brake required level RQ to 0 in order to prohibit regenerative braking by motor generator MG2. Alternatively, brake control unit 32A may be configured to stop the generation of regenerative brake required level RQ when flag FLG2 is OFF.

When brake pedal stroke sensor 41 detects an operation on brake pedal 40 in an OFF state of flag FLG2, braking by only hydraulic brake 42 is executed.

In other words, regenerative braking by motor generator MG2 is prohibited during a selected sub power storage device disconnection process in the second embodiment.

When brake pedal stroke sensor 41 detects an operation on brake pedal 40 when flag FLG2 is in an ON state, brake control unit 32A calculates regenerative brake required level RQ and outputs the calculated regenerative brake required level RQ to electric system control unit 31A. Regenerative brake required level RQ is calculated based on, for example, the vehicular speed and the control input of brake pedal 40 detected by brake pedal stroke sensor 41. Electric system control unit 31A generates a control signal PWMC2 (regeneration instruction) for controlling inverter 22 based on the calculated regenerative brake required level RQ, and provides control signal PWMC2 to inverter 22. Accordingly, inverter 22 controls motor generator MG2.

The value of flag FLG2 is switched between "1" and "0". For example, an ON state and an OFF state correspond to the value of "1" and "0", respectively, of flag FLG2.

Figure 18:
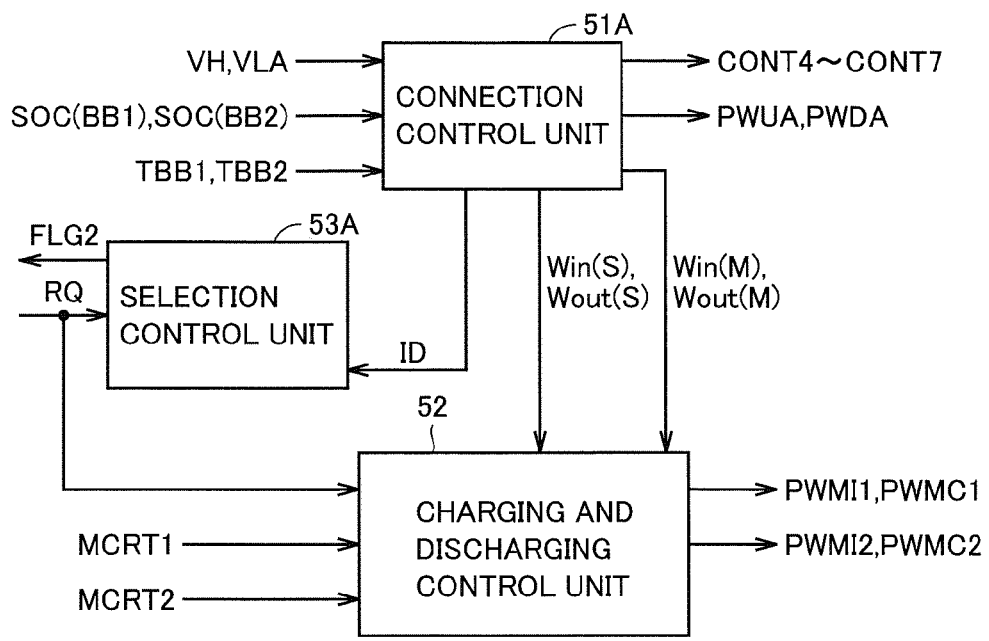
FIG. 18 is a functional block diagram for describing a configuration of an electric system control unit 31A shown in FIG. 17.

FIG. 18 is functional block diagram for describing a configuration of electric system control unit 31A shown in FIG. 17. Referring to FIGS. 18 and 5, electric system control unit 31A differs from electric system control unit 31 in that a connection control unit 51A and a selection control unit 53A are incorporated instead of connection control unit 51 and selection control unit 53, respectively. The configuration of the remaining elements of electric system control unit 31A is similar to the configuration of corresponding elements in electric system control unit 31.

Connection control unit 51A outputs a variable ID (−1 or any of 0 to 4) to selection control unit 53A. Selection control unit 53A determines whether a selected sub power storage device disconnection process is currently executed or not based on variable ID. Selection control unit 53A sets flag FLG2 at an OFF state when determination is made that a selected sub power storage device disconnection process is currently executed. In contrast, selection control unit 53A sets flag FLG2 at an ON state when determination is made that the selected sub power storage device disconnection process is not executed based on variable ID.

The procedure of the selected sub power storage device disconnection process according to the second embodiment is similar to the process procedure shown in the flowchart of FIG. 7, provided that the process of step S100 (disconnection determination process of a selected sub power storage device) in the second embodiment differs from that of the first embodiment.

Figure 19:
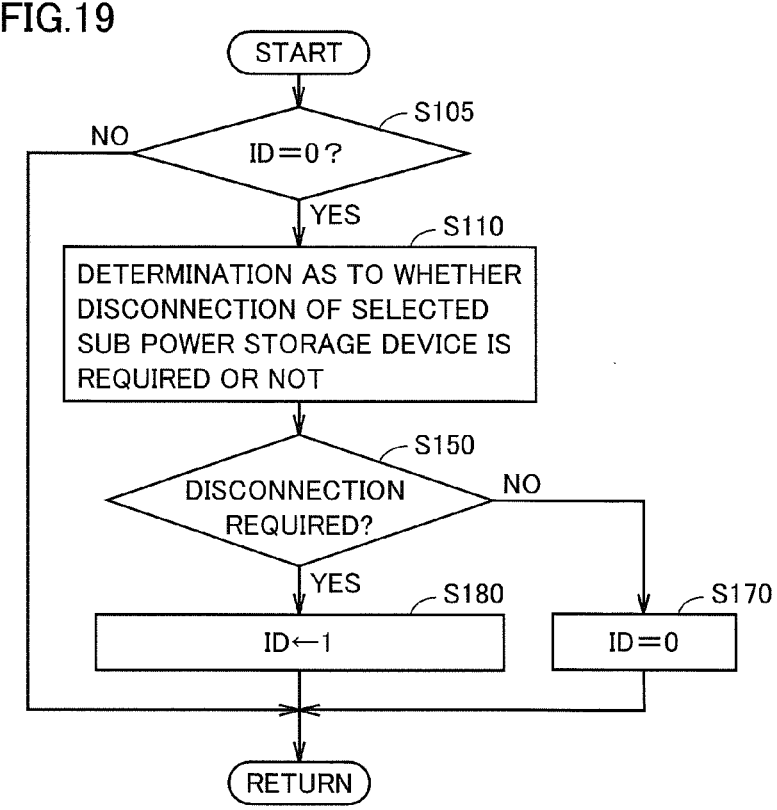
FIG. 19 is a flowchart for describing in detail a disconnection determination process according to the second embodiment.

FIG. 19 is a flowchart for describing in detail a disconnection determination process (S100) according to the second embodiment. Referring to FIGS. 19 and 8, the disconnection determination process of the second embodiment differs from the disconnection determination process of the first embodiment in that the process of step S155 is omitted. In the switching determination process according to the second embodiment, control device 30A (connection control unit 51A) proceeds to step S150 to confirm the determination result made as to whether disconnection is required or not at step S110. When determination is made that disconnection is required (YES at step S150), control device 30A proceeds to step 180 to set ID=1 to proceed with the disconnection process. When determination is made that disconnection of the selected sub power storage device is not required at step S150 (NO at step S150), control device 30A proceeds to step S170 to maintain ID=0.

The processes of the remaining steps in the flow chart of FIG. 18 are similar to those of the corresponding steps in the flowchart of FIG. 8. Therefore, description thereof will not be repeated. In the second embodiment, the processes of steps S200-S500 are executed likewise with the process of the flowchart shown in FIGS. 9-12.

Connection control unit 51A is similar to connection control unit 51 shown in FIG. 14 with the exception that variable ID is output to selection control unit 53A, and that flag FLG1 is not input. Therefore, the configuration of the functional element for the selected sub power storage device disconnection process at connection control unit 51A is similar to the configuration shown in FIG. 14.

Next, a process of selection control unit 53A and brake control unit 32A will be described hereinafter.

Figure 20:
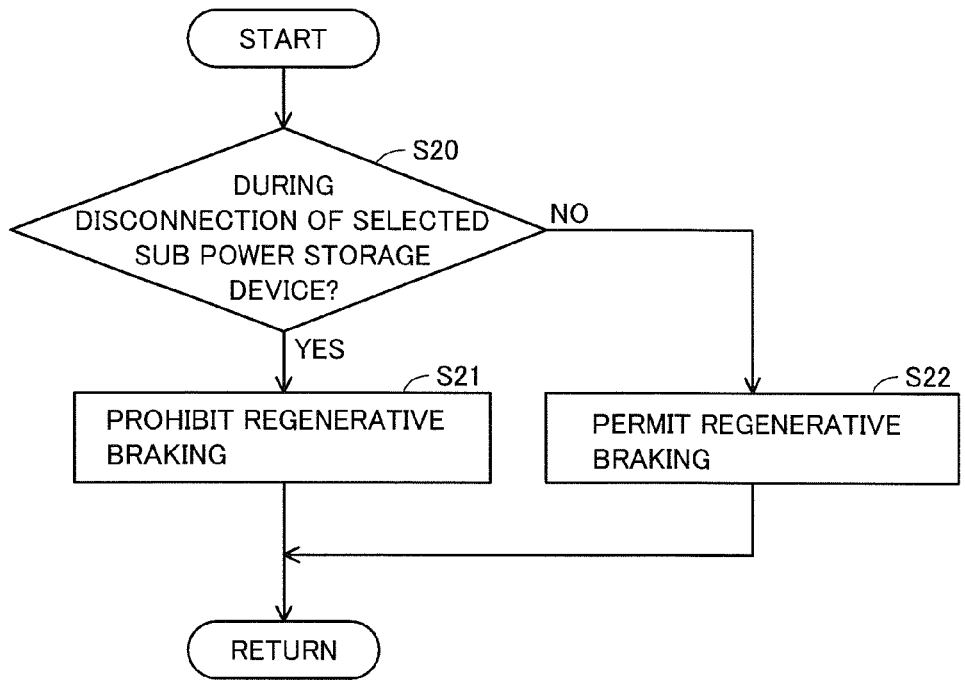
FIG. 20 is a flowchart for describing a process of a selection control unit 53A shown in FIG. 18.

FIG. 20 is a flowchart for describing a process of selection control unit 53A shown in FIG. 18. Selection control unit 53A can repeatedly execute the control process procedure according to the flow chart shown in FIG. 20 periodically as predetermined by executing a prestored predetermined program periodically as predetermined.

Referring to FIG. 20, selection control unit 53A determines whether disconnection of a selected sub power storage device is currently carried out based on variable ID output from connection control unit 51A (step S20). Specifically, selection control unit 53A determines that a selected sub power storage device disconnection process is not currently executed when variable ID is −1 or 0. When variable ID is any of 1 to 4, selection control unit 53A determines that a disconnection process of a selected sub power storage device is currently executed. When determination is made that a selected sub power storage device disconnection process is currently executed (YES at step S20), selection control unit 53A prohibits regenerative braking. In other words, selection control unit 53A sets flag FLG2 at an OFF state. When determination is made that switching control of the selected sub power storage device is not executed (NO at step S20), selection control unit 53A permits regenerative braking. In other words, selection control unit 53A sets flag FLG2 at an ON state.

Figure 21:
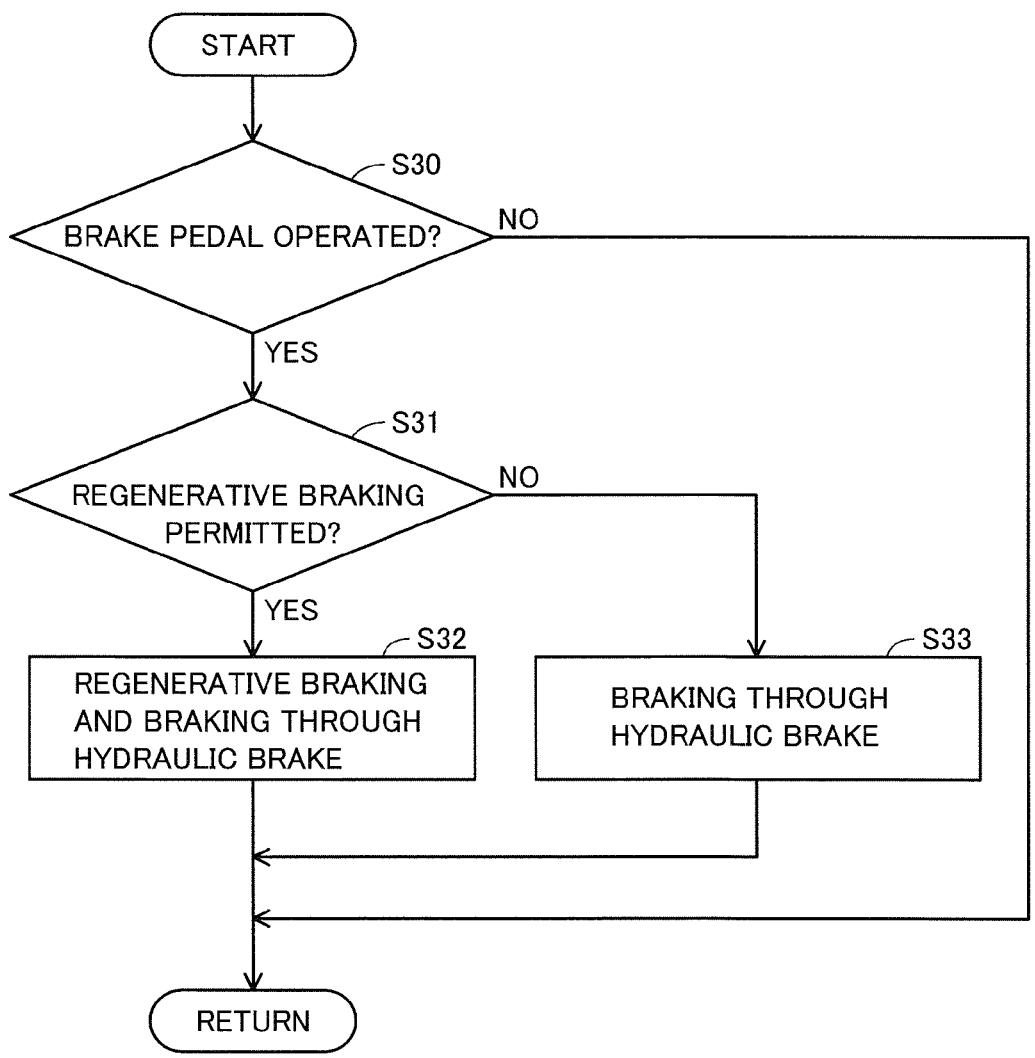
FIG. 21 is a flowchart for describing a process of a brake control unit 32A shown in FIG. 17.

FIG. 21 is a flowchart for describing a process of brake control unit 32A shown in FIG. 17. Control device 30 (brake control unit 32A) can repeatedly execute the control process procedure according to the flow chart shown in FIG. 21 periodically as predetermined by executing a prestored predetermined program periodically as predetermined.

Referring to FIG. 21, brake control unit 32A determines whether brake pedal 40 has been operated by the user or not based on a detection result of brake pedal stroke sensor 41 (step S30). An operation on brake pedal 40 by the user implies generation of a brake request. In other words, determination is made as to whether a brake request is generated or not at step S30.

When determination is made that the user has operated brake pedal 40 (YES at step S30), brake control unit 32A determines whether regenerative braking is permitted or not based on flag FLG2 (step S31). When flag FLG2 is ON, i.e. when regenerative braking is permitted (YES at step S31), brake control unit 32A calculates regenerative brake required level RQ, and then executes regenerative braking and braking by hydraulic brake 42 (step S32). When flag FLG2 is OFF, i.e. when regenerative braking is prohibited (NO at step S31), brake control unit 32A sets regenerative brake required level RQ to 0, and executes braking by hydraulic brake 42 alone (step S33).

When determination is made that the user is not operating brake pedal 40 (NO at step S30), the processes of steps S31-33 set forth above are skipped.

As shown in FIG. 15, when regenerative braking of motor generator MG2 is permitted in a selected sub power storage device disconnection mode, the executed level of regenerative braking is also decreased by reduction in the upper limit on electric power input Win (S) of the selected sub power storage device. One possible approach is to increase the braking force by the hydraulic brake in accordance with reduction in the executed level of regenerative braking. However, in the case where the absolute value of the rate of change of the executed level of regenerative braking is large as compared to the rate of change of the upper limit on electric power input/output, there is a possibility of the driver having the impression of weaker brake efficiency, for example.

According to the second embodiment, regenerative braking (power generation) by motor generator MG2 is prohibited during execution of a selected sub power storage device disconnection process. When the brake pedal is operated during execution of a selected sub power storage device disconnection process, braking by only the hydraulic brake is executed. This can prevent change in the driver's impression on the vehicle response with respect to the operation of the brake pedal. According to the second embodiment, any adverse effect of a sub power storage device disconnection process on the braking of the electric powered vehicle can be prevented.

The embodiments set forth above are based on a series/parallel type hybrid vehicle having the engine power split by a power split device for transmission to the driving wheel and motor generator. The present invention is also applicable to the series type hybrid vehicle using the engine only to drive the motor generator and generating the driving force of the axle only at the motor that consumes the electric power generated by the motor generator, to an electric vehicle, as well as to a fuel cell vehicle. Since all such vehicles allow regenerative braking by a motor directed to driving the vehicle, the present invention is applicable thereto.

It should be understood that the embodiments disclosed herein are illustrative and non-restrictive in every respect. The scope of the present invention is defined by the appended claims, rather than the description set forth above, and all changes that fall within limits and bounds of the claims, or equivalence thereof are intended to be embraced by the claims.

REFERENCE SIGNS LIST

1: electric powered vehicle, 2: wheel, 3: power split device, 4: engine, 6: battery charging converter (external charging), 8: external power supply, 9A, 9B1, 9B2, 24, 25: current sensor, 10A, 10B1, 10B2, 13, 21A, 21B: voltage sensor, 11A, 11B1, 11B2: temperature sensor, 12A, 12B: converter, 14, 22: inverter, 15 U phase arm, 16: V phase arm, 17: W phase arm, 30, 30A: control device, 31, 31A: electric system control unit, 32, 32A: brake control unit, 39A, 39B: connection unit, 40: brake pedal, 41: brake pedal stroke sensor, 42: hydraulic brake, 51, 51A: connection control unit, 52: charging and discharging control unit, 53, 53A: selection control unit, 100: disconnection determination unit, 110: step-up voltage instruction unit, 120, 130: electric power limiter unit, 140: disconnection control unit, 150: stop-stepping-up-voltage permission unit, 160: disconnection prohibition unit, 200: converter control unit, 250; traveling control unit, 260: total power calculation unit, 270, 280: inverter control unit, BA: battery (main power storage device), BB: selected sub power storage device, BB1, BB2: battery (sub power storage device), C1, C2, CH: smoothing capacitor, CMBT: voltage step-up command signal, CONT1-CONT7: relay control signal, D1-D8: parallel diode, FBT, FLG1, FLG2: flag, IA: input/output current, IB: current, ID: variable, IGON: start signal, L1: reactor, MCRT1, MCRT2: motor current value, MG1, MG2: motor generator, N2 node, PL1A, PL1B: power supply line, PL2: electric power feeding line, Pttl: total required power, PWMI1, PWMI2, PWMC, PWMC1, PWMC2: control signal (for inverter), PWU, PWUA, PWDA, PWD, PWDA, PWDB: control signal (for converter), Q1-Q8: IGBT device, R: limiting resistor, RQ regenerative brake required level, SL1, SL2: ground line, SMR1-SMR3: system main relay, SR1 SR1G, SR2, SR2G: relay, TA, TBB, TBB1, TBB2: temperature (battery), Tqcom1, Tqcom2: torque command value, UL, VL, WL: line (3 phase), VBA, VBB1, VBB2, VLA, VLB, VH: voltage, VHref: voltage command value, Win, Win(M): Win(S): upper limit on electric power input Wout: Wout(M), Wout(S): upper limit on electric power output

The invention claimed is:

1. An electric powered vehicle comprising:
   a motor capable of generating vehicle driving power, and performing regenerative braking;
   an inverter for controlling said motor;
   a main power storage device;

an electric power feeding line for supplying electric power to said inverter for generation of said vehicle driving power by said motor, and transmitting power output from said inverter by said regenerative braking of said motor;

a first voltage converter provided between said electric power feeding line and said main power storage device, and configured to perform voltage conversion bidirectionally;

a plurality of sub power storage devices provided parallel with each other; a second voltage converter provided between said plurality of sub power storage devices and said electric power feeding line, and configured to perform voltage conversion bidirectionally between a selected one of said plurality of sub power storage devices and said electric power feeding line;

a connection unit provided between said plurality of sub power storage devices and said second voltage converter, and configured to connect and disconnect the selected sub power storage device to and from said second voltage converter; a connection control unit configured to execute a disconnection process to disconnect said selected sub power storage device from said second voltage converter based on a state of charge of said selected sub power storage device when there is no new sub power storage device that can replace said selected sub power storage device;

a traveling control unit configured to execute a braking process controlling said inverter for said regenerative braking by said motor; and a selection control unit configured to prohibit execution of, during execution of one process of said disconnection process by said disconnection control unit and said braking process by said traveling control unit, execution of the other process.

2. The electric powered vehicle according to claim 1, wherein said disconnection process includes a first process of determining whether disconnection of said selected sub power storage device from said second voltage converter is required or not based on said state of charge of said selected sub power storage device, a second process of controlling said first voltage converter such that a voltage of said electric power feeding line attains a predetermined voltage higher than an output voltage from said main power storage device and an output voltage from said selected sub power storage device, when determination is made that disconnection of said selected sub power storage device is required, a third process of setting an upper limit on electric power input/output by said selected sub power storage device at zero after the voltage of said electric power feeding line reaches said predetermined voltage, and a fourth process of controlling said connection unit such that said selected sub power storage device is disconnected from said second voltage converter in response to said upper limit on electric power input/output being set at zero, said connection control unit includes a disconnection determination unit configured to execute said first process, a step-up voltage instruction unit configured to execute said second process, an electric power limiter unit configured to execute said third process, and a disconnection control unit configured to execute said fourth process.

3. The electric powered vehicle according to claim 2, wherein said electric power limiter unit is configured to gradually decrease said upper limit on electric power input/output down to zero when said third process is executed.

4. The electric powered vehicle according to claim 1, wherein said one process is said braking process, and said other process is said disconnection process.

5. The electric powered vehicle according to claim 1, wherein said one process is said disconnection process, and said other process is said braking process.

6. The electric powered vehicle according to claim 5, further comprising:

a hydraulic brake capable of generating a braking force of said electric powered vehicle independent of said regenerative braking by said motor; and a brake control unit configured to execute braking only by said hydraulic brake when a braking request of said electric powered vehicle is generated during execution of said disconnection process.

7. A control method for an electric powered vehicle, wherein said electric powered vehicle including a motor generating vehicle driving power, and performing regenerative braking, an inverter for controlling said motor, a main power storage device, an electric power feeding line for transmitting electric power, a first voltage converter provided between said electric power feeding line and said main power storage device, a plurality of sub power storage devices provided parallel with each other;

a second voltage converter provided between said plurality of sub power storage devices and said electric power feeding line, a connection unit provided between said plurality of sub power storage devices and said second voltage converter, and a control device configured to control said inverter and said connection unit, said control method comprising the steps of:

executing a disconnection process to disconnect a selected sub power storage device from said second voltage converter based on a state of charge of said selected sub power storage device when there is no new sub power storage device that can replace said selected sub power storage device;

executing a braking process controlling said inverter for said regenerative braking by said motor; and prohibiting, during execution of one process of said disconnection process and said braking process, execution of the other process.

8. The control method for an electric powered vehicle according to claim 7, wherein said disconnection process includes a first process of determining whether disconnection of said selected sub power storage device from said second voltage converter is required or not based on said state of charge of said selected sub power storage device, a second process of controlling said first voltage converter such that a voltage of said electric power feeding line attains a predetermined voltage higher than an output voltage from said main power storage device and an output voltage from said selected sub power storage device, when determination is made that disconnection of said selected sub power storage device is required, a third process of setting an upper limit on electric power input/output by said selected sub power storage device at zero after the voltage of said electric power feeding line reaches said predetermined voltage, and a fourth process of controlling said connection unit such that said selected sub power storage device is disconnected from said second voltage converter when said upper limit on electric power input/output is set at zero, said step of executing said disconnection process includes the steps of:
executing said first process;
executing said second process;
executing said third process; and
executing said fourth process.

9. The control method for an electric powered vehicle according to claim 8, wherein said step of executing said third process includes a step of gradually decreasing said upper limit on electric power input/output down to zero.

10. The control method for an electric powered vehicle according to claim 7, wherein
said one process is said braking process, and
said other process is said disconnection process.

11. The control method for an electric powered vehicle according to claim 7, wherein
said one process is said disconnection process, and
said other process is said braking process.

12. The control method for an electric powered vehicle according to claim 11, wherein
said electric powered vehicle further includes a hydraulic brake generating a braking force of said electric powered vehicle independent of said regenerative braking by said motor,
said control method further comprising a step of
executing braking only by said hydraulic brake by said control device when a braking request of said electric powered vehicle is generated during execution of said disconnection process.

* * * * *